US 6,453,261 B2

(12) United States Patent
Boger et al.

(10) Patent No.: US 6,453,261 B2
(45) Date of Patent: Sep. 17, 2002

(54) VALVE POSITIONER SYSTEM

(75) Inventors: Henry Boger, Foxboro; Christopher Colwell, Mansfield; Peter Levesque, Norwood; Larry Schoonover, North Attleboro, all of MA (US); Raymond Villier, Conde sur Noireau; Denis Vital, Montsecret, both of (FR); Chunhe Zhou, Stoughton; James Stares, Norton, both of MA (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 09/832,475

(22) Filed: Apr. 10, 2001

Related U.S. Application Data

(62) Division of application No. 09/118,406, filed on Jul. 17, 1998, now Pat. No. 6,272,401.
(60) Provisional application No. 60/053,648, filed on Jul. 23, 1997.

(51) Int. Cl.[7] .................................................. G01L 7/18
(52) U.S. Cl. ...................................... 702/138; 702/150
(58) Field of Search .................. 137/486, 85; 700/282; 131/1; 73/592, 862.191; 702/150, 138

(56) References Cited

U.S. PATENT DOCUMENTS

| 4,029,122 A | 6/1977 | Jaegtner ..................... 137/551 |
| 4,263,997 A | 4/1981 | Poore ........................ 192/103 |
| 4,274,438 A | 6/1981 | La Coste .................... 137/551 |
| 4,481,451 A | 11/1984 | Kautz et al. ................ 318/628 |
| 4,523,286 A | 6/1985 | Tsuguaki |

(List continued on next page.)

FOREIGN PATENT DOCUMENTS

JP   8-018329   1/1996   ........... F16K/31/06

OTHER PUBLICATIONS

Fisher Bulletin 62.1:VL1000; DVC5000, DVC5000(S1); DT4000; Jun. 1994, pp. 1–26.

(List continued on next page.)

*Primary Examiner*—Marc S. Hoff
*Assistant Examiner*—Felix Suarez
(74) *Attorney, Agent, or Firm*—Jenkens & Gilchrist

(57) ABSTRACT

A valve positioner system that includes one or more unique control methods and devices, including several routines to facilitate the continuous maintenance, calibration and adjustment requirements of the valve. The positioner system may utilize pressure and position feedback signals to monitor the valve. The positioner system may utilize an external controller for various diagnostic and other routines. The positioner system can provide automatic positioning and can operate in a manual operating mode or an automatic operating mode. The positioner system can diagnose the valve while the valve process is running or during a maintenance operation. The positioner system can provide nonlinear control of the valve position. The positioner system can self-tune and self-characterize the valve to assure uniform position control. The positioner system can provide valve control through pressure feedback when a position feedback fails or other diagnosed problems. The positioner system can provide constraints to prevent slope reversal or slope changes in the valve characterization that would produce undesirable valve gain.

10 Claims, 24 Drawing Sheets

U.S. PATENT DOCUMENTS

| | | | | |
|---|---|---|---|---|
| 4,556,956 | A | | 12/1985 | Dickenson et al. |
| 5,070,846 | A | | 12/1991 | Dudek et al. ............... 123/488 |
| 5,197,328 | A | | 3/1993 | Fitzgerald .................... 73/168 |
| 5,249,954 | A | | 10/1993 | Allen et al. ................... 431/14 |
| 5,251,148 | A | | 10/1993 | Haines et al. ............... 364/509 |
| 5,272,647 | A | * | 12/1993 | Hayes .................. 364/551.01 |
| 5,329,465 | A | | 7/1994 | Arcella et al. ......... 364/551.01 |
| 5,431,182 | A | * | 7/1995 | Brown ......................... 137/85 |
| 5,469,737 | A | | 11/1995 | Smith et al. ................... 73/168 |
| 5,526,690 | A | * | 6/1996 | Louie et al. ................... 73/592 |
| 5,543,696 | A | | 8/1996 | Huggett et al. ............. 318/590 |
| 5,549,137 | A | * | 8/1996 | Lenz et al. ................. 137/486 |
| 5,573,032 | A | | 11/1996 | Lenz et al. ................. 137/486 |
| 5,654,885 | A | * | 8/1997 | Mayhew et al. ............ 364/181 |
| 5,884,894 | A | | 3/1999 | Smith .......................... 251/28 |
| 6,016,875 | A | | 1/2000 | Orbach et al. ................. 172/2 |
| 6,035,878 | A | * | 3/2000 | Adams et al. .................. 137/1 |
| 6,272,401 | B1 | * | 8/2001 | Boger et al. ................ 700/282 |

OTHER PUBLICATIONS

Fisher Bulletin 62.1:DT4000(S1); Sep. 1994, pp. 1–8.

Fisher Bulletin 62.1:DT4000; Dec. 1995, pp. 1–12.

Foxboro/Eckardt SRD991 Product Information, Oct. 1995, pp. 1–2.

Hartmann & Braun, Intelligent Positioner TZID—Product Information, pp. 1–2.

Honeywell, Series EP2300 Electro–pneumatic positioner—Product Information, pp. 1–4.

Moore, ValvePAC Intelligent Valve Control—Product Information, pp. 1–5.

Neles–Jamesbury, The ND800 Valve Controller—Product Information, pp. 1–4.

Samson, Product Information, pp. 1–23.

Siemens, SIPART PS—Product Information, pp. 1–6.

Valtek, Logix/StarPac/StarPacII—Product Information, pp. 1–17.

Hart, IcoT—Product Information, pp. 1–17.

Worcester Controls, Pulsair—Product Information, pp. 1–25.

* cited by examiner

TO Fig. 6b

VALVE POSITIONER SYSTEM

CROSS REFERENCE

This is a divisional of application Ser. No. 09/118,406 filed on Jul. 17, 1998 which is U.S. Pat. No. 6,272,401 relies on provisional application serial No. 60/053,648 filed on Jul. 23, 1997.

BACKGROUND OF THE INVENTION

The present invention relates to a positioner system for controlling a fluid control valve and, more particularly, to an intelligent positioner system and software routines for controlling the operation thereof.

Fluid control valves are used to control the transmission and distribution of fluids, such as liquids and gases. In such applications there often are requirements for highly reliable and accurate valves for proper performance. However, due to the physical performance of the valve, as well as the environment in which the valve operates, periodic maintenance, calibration and adjustment of the valve must be maintained throughout its operation. Furthermore, the valve can exhibit non-linear and seemingly unpredictable behavior. For example, high friction in the valve may cause stick-slip behavior when the valve is being adjusted between an open and closed position. In addition, ambient temperatures and aging affect component characteristics and cause position errors.

Many valves are fitted with actuators and positioners to control the valve movement. Furthermore, some positioners are computer controlled. However, such control has been somewhat limited. In addition, the conventional computer-controlled positioners do not adequately predict actual valve behavior. Therefore what is needed is a valve positioner that facilitates the continuous maintenance, calibration and adjustment requirements of the valve.

SUMMARY OF THE INVENTION

In response to such difficulties, a technical advance is achieved by providing a valve positioner system that includes one or more unique control methods and corresponding devices, including several routines to facilitate the continuous maintenance, calibration and adjustment requirements of the valve.

In one embodiment, a method is used for detecting limit cycling in the valve. The method first measures a plurality of positions and actuator pressures for the valve. The method then determines zero crossings for the position and pressure measurements to determine a phase relationship. The phase relationship can then be compared to a predetermined value in order to detect limit cycling.

In another embodiment, a method provides bumpless transfer from a manual mode of operation to an automatic mode of operation. The method first determines when the automatic mode has been selected. It then receives a position signal from the automatic mode for a new position and a valve position from the valve. The new position is compared to the valve position, and if it is within a predefined limit, the method allows the valve to enter automatic mode. If the new position is outside of the predefined limit, the method holds the valve in a current position, informs the user of the discrepancy in positions, and/or instructs the user to manually adjust the valve closer to the new position.

In yet another embodiment, a method calculates a unique BIAS for the positioner. The valve is allowed to move in a first direction; the BIAS value for the positioner is repeatedly calculated and averaged over a period of time, the current BIAS value being compared to the average. If the current BIAS value differs significantly from the average BIAS value, the repeated averaging is stopped, thereby stabilizing the BIAS value. Also, if the positioner tries to move the valve in a second direction, the current BIAS is replaced with the average BIAS value.

In yet another embodiment, a method is used for measuring a valve signature. First, a spool valve of the actuator is opened to increase actuator pressure. As the valve is opening, a plurality of pressure data for the actuator and position data for the valve are measured. Then the spool valve is closed to decrease the actuator pressure. As the valve is closing, a plurality of pressure data for the actuator and position data for the valve is also measured. The measured data is then analyzed to determine friction and hysteresis for the valve so that the valve signature can be determined.

In yet another embodiment, a method is used for performing diagnostics on the valve. The method first positions the valve at a fist end of a test range of valve positions. Fluid pressure to the actuator is increased until it reaches a second end of the test range. The fluid pressure to the actuator is then decreased until it reaches the first end of the test range. Throughout the movement, valve position and actuator pressure data are sampled and stored in memory for later diagnosis.

In yet another embodiment, a method provides valve response feedback to the user. A position set point for the valve is received from the valve controller and the actual valve position from the valve feedback. The actual valve position is then displayed on a graph along with a characterization of the position set point. If the valve is operating correctly, the actual valve position and the characterization of the set point will align on the graph.

In yet another embodiment, a method compensates for twist of a shaft of a rotary-type valve. First the valve positioner is calibrated while the valve is in a no-force condition. Then a gradient for the angular displacement of the rotary valve verses positioner signal is determined. A difference in actuator pressure for a predetermined valve position is determined both when the valve is in the no-force condition and when the valve is in a force condition. A correction function for the valve can then be determined from the gradient and the difference in actuator pressures.

In yet another embodiment, a method provides nonlinear position control of the valve. The method uses a firs; and second gain, one for each valve direction. The method also uses an adjustable gain to compensate for size-related and position-related valve nonlinearities. When a desired position signal for the valve is received, it can then be adjusted by the adjustable gain and either the first or second gain to determine a calculated position signal for the valve.

In yet another embodiment, a self-adjusting method is used for positioning the valve. The method first finds a current BIAS for the I/P transducer. An open-loop test on the valve is performed using the current BIAS for obtaining a system characteristic and a control parameter. The control parameter can then be tuned to achieve an improved dynamic response of the valve.

In yet another embodiment, a method is used for characterizing the valve to obtain uniformity of control performance. A first position signal is used to move the valve. At least one process variable from the valve responsive to the first position signal is measured and stored with the first position signal in the cross-reference table. A position set point can then be received, adjusted by the cross-reference table, and used as a second positioning signal to the valve.

In yet another embodiment, a method is used to position the valve in case of position feedback failure. The method stores a plurality of pressures corresponding to a plurality of positions in memory. Then, when a desired position is received and the position feedback is found to be in failure, the valve can be positioned by choosing one of the stored positions and providing the corresponding actuator pressure for positioning the valve.

In yet another embodiment, a method detects seat leakage in the valve. Whenever the valve is within a minimum controllable valve lift point for an extended period of time, a maintenance action, such as notifying the user, is performed.

In yet another embodiment, a method supports custom characterization of the valve while imposing constraints to prevent a detrimental valve characteristic. A graph including a plurality of points relating flow capacity to valve position is provided to the user. The points illustrate the valve characteristic and the user can change the characteristic by changing one or more of the points. Upon receiving a position change request from the user, the method determines if there is a detrimental valve characteristic, such as a slope reversal. If so, the user is prompted for another position change.

BRIEF DESCRIPTION OF THE DRAWINGS

FIG. 18 is a flow diagram for a parameter determination routine used by the routine of FIG. 17a.

DESCRIPTION OF THE PREFERRED EMBODIMENT

Figure 1:
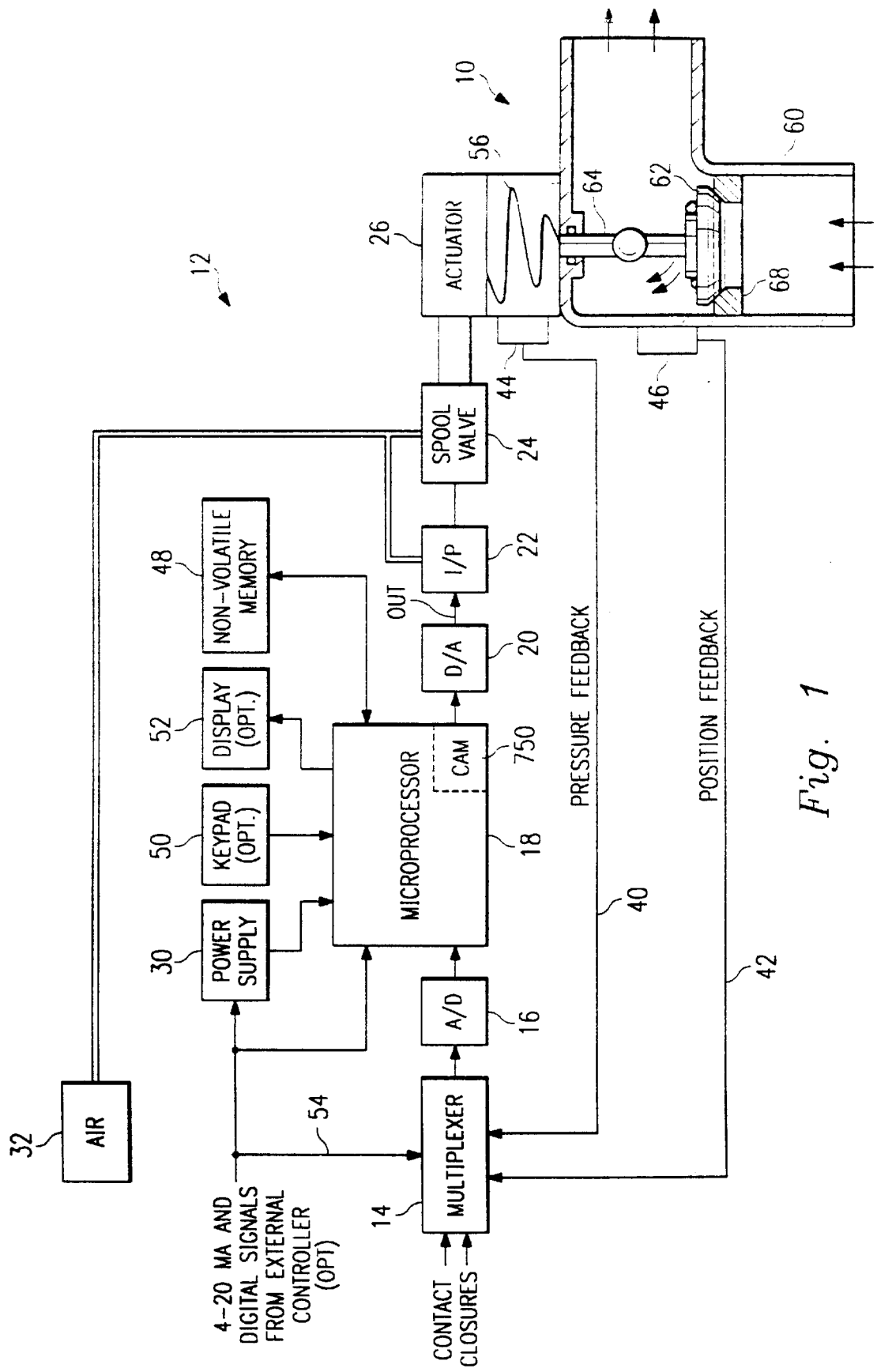
FIG. 1 is a block diagram of a positioner system employing principles of the present invention for controlling a valve.

Referring to FIG. 1 of the drawings, a valve 10 is controlled by a positioner system 12 implementing features of the present invention. The positioner system 12 includes a multiplexer 14, an analog to digital ("A/D") converter 16, a microprocessor 18, a digital to analog ("D/A") converter 20, a current to pressure ("I/P") transducer 22, a spool valve 24, and an actuator 26. The positioner 12 is supported by a power supply 30 and an air supply 32.

The multiplexer 14 receives several signals including a pressure feedback signal 40 from the actuator 26 and a position feedback signal 42 from the valve 10. The pressure feedback signal 40 is derived from a pressure sensor 44 that is pneumatically linked to the actuator 26 and the position feedback signal 42 is derived from a position feedback sensor 46 that is mechanically linked to the valve 10. Therefore, as the positions of the valve and actuator change, the pressure feedback signal 40 and the position feedback signal 42 indicate the changing positions to the multiplexer 14.

In some embodiments the position sensor 46 is separated from the rest of the positioner 12. For example, in situations where the valve 10 is located in a harsh environment, the positioner 12 can be separately located, with only the position sensor 46 attached to the valve 10. As a result, only the air line from the I/P transducer 22, the position sensor 46, and the line for the feedback signal 42 are in the harsh environment.

The multiplexer 14 provides the signals to the microprocessor 18 through the A/D converter 16. The microprocessor 18 includes software code, described in greater detail below, to monitor the position of the valve 10, as well as a controller (not shown) to perform various valve-positioning routines. In some embodiments, the controller may be remote from the positioner 12 while in other embodiments, the controller is part of the microprocessor 18. Hereinafter, functionality assigned to either the controller or the microprocessor 18 is interchangeable between the two.

The microprocessor 18 may store one or more programs internally or in an external memory, such as a non-volatile memory 48. Furthermore, the microprocessor 18 may be externally interfaced by devices such as a keypad 50, and a display 52. The external controller interfaces with the microprocessor 18 through an input signal 54 connected to the multiplexer 14. In some embodiments, especially those that utilize the external controller, the keypad 50 and display 52 may not exist. In these embodiments, input and output devices associated with the external controller perform the identical functions.

In response to the stored programs and external interfaces, the microprocessor 18 (with/out the external controller) controls the valve 10 position by driving electronic position signals. The microprocessor 18 provides the electronic position signals to the I/P transducer 22 through the D/A converter 20, which converts the signals to an analog signal "OUT." The IP transducer 22, which also receives a regulated air supply from the air source 32, converts the OUT signal to pneumatic position signals.

The IP transducer 22 provides the pneumatic position signals to the actuator 26 through the spool valve 24. The actuator 26 is a conventional diaphragm, such as a spring loaded (spring 56) device for controlling the position of the valve 10. The actuator 26 may be single or double acting and may be connected to the valve 10 so that an increasing pressure closes the valve, or alternatively, so that an increasing pressure opens the valve.

The valve 10 is a conventional valve and may be one of many different types, including a rotary type discussed in greater detail below with respect to FIG. 11. For the sake of example, the valve 10 includes a casing 60 through which a fluid may flow, a valve plug 62, and a valve stem 64. The casing 60 includes a seat 68 such that, when the plug 62 is pressed against the seat, the valve is closed and when the plug is separated from the seat, the valve is open. The actuator 26, in response to the pneumatic signals from the I/P transducer 22, moves the valve stem 64, and thus the plug 62, back and forth, thereby opening and closing the valve. Many forces act on the valve stem 64 and plug 62, including for example spring forces from the actuator 26, fluid forces, and frictional forces. It is understood that valves and their associated forces are well known in the art and that the above description is merely representative of many different types of valves. For the remaining description, general reference to the valve 10 is directed a towards the valve plug 62 and valve stem 64 unless otherwise indicated.

Associated with the valve 10 is a flow characteristic. A flow characteristic describes the flow capacity for the valve 10 verses travel (open or close) of the valve. Typical flow characteristics include linear and non-linear. One type of non-linear flow characteristic is called equal percentage, e.g., if the valve 10 is 50% to open, the flow capacity for the valve is at 50%. Typically with equal percentage, the valve does not open linearly as a function of the control signal, but instead opens very slowly at first and then more rapidly at the end. Customized characteristics for the valve 10 are also available, as discussed in greater detail below.

Limit Cycle Detection in a Microprocessor Controlled Valve Positioner

In conventional positioner systems, even those that are microprocessor controlled, the positioner is often unable to set the valve at the desired set-point. Instead, a control loop in the positioner tends to cycle back and forth around the desired set-point (limit cycling). This may be caused by process noise, a poorly tuned loop, or a limit cycling valve. It is often difficult to determine what is the cause of the limit cycling.

One reason for limit cycling is friction. When an actuator attempts to move a valve to a new position, the actuator has to continually build up pressure until finally it overcomes friction in one direction and the valve starts to move. Then when the valve has moved, the control loop comes around and tries to make it go the opposite direction. So once again, the actuator has to continually build up pressure until finally it overcomes friction. The time it takes for the actuator to build up sufficient pressure to start the valve moving is "lag", and the difference between position and pressure is "phase shift."

The present invention serves to calculate the phase shift and then to determine whether or not limit cycling is occurring. Therefore, the relationship between valve position and actuator pressure can be used to determine the presence and source of limit cycling. Once determined, the limit cycling can be handled in different ways, including notifying the user, updating a maintenance schedule for the valve, and so forth.

Figure 2:
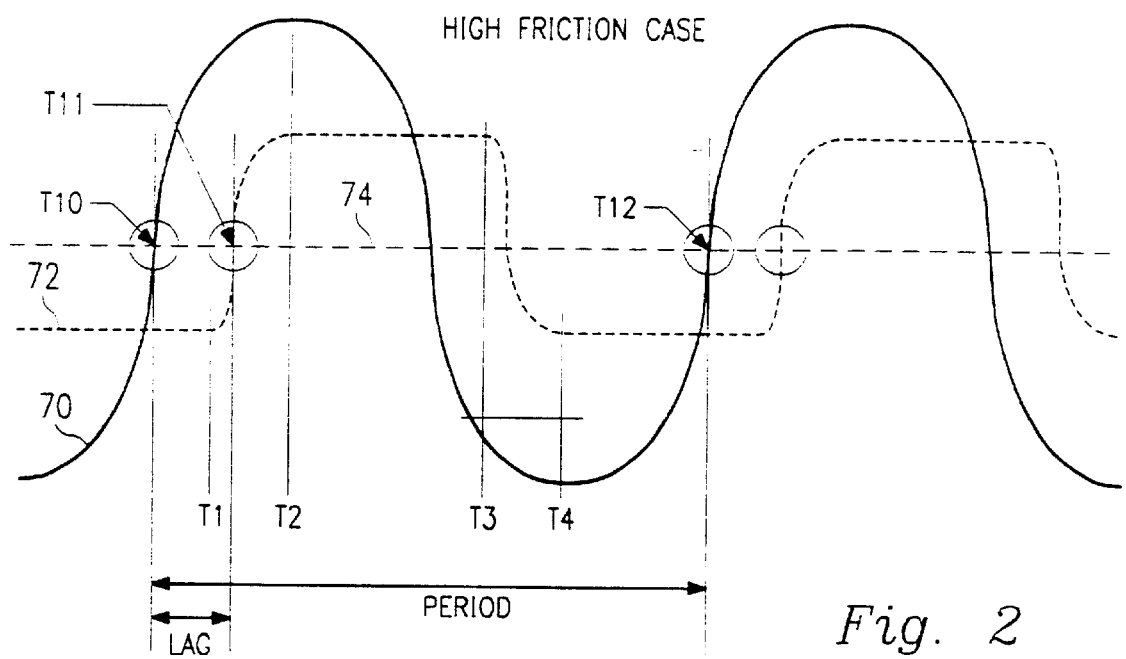
FIGS. 2 and 3 are position and pressure vs. time graphs for a valve.

Referring to FIG. 2, consider for example a sinusoidal pressure which drives the valve actuator 26. The actuator and valve 10 have friction associated therewith. In a high-friction case, a solid trace 70 represents pressure as a function of time, the dotted trace 72 represents valve position as a function of time, and the dashed trace 74 represents the average value of position and of pressure. At a time T1, the pressure is high enough to overcome friction and the valve 10 begins to move, driven by the increasing pressure. At a time T2, the pressure stops increasing and begins to decrease. As a result, the valve 10 stops moving until, at a time T3, the pressure is low enough to again overcome friction and the valve 10 begins to move again.

Figure 3:
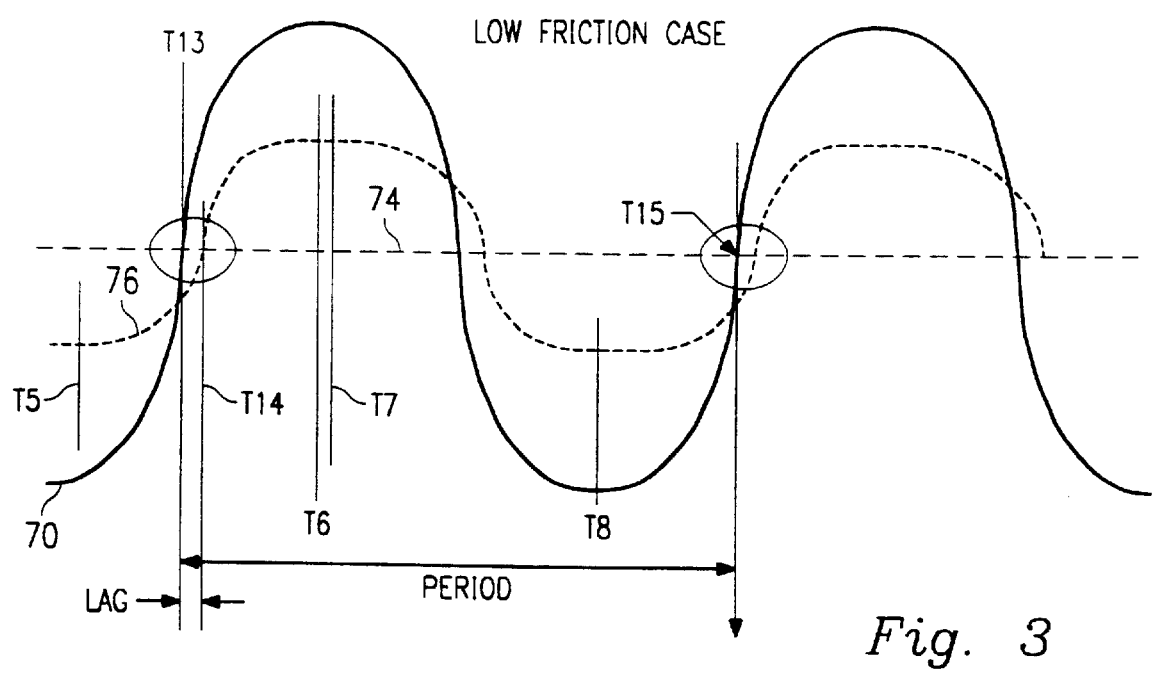

Referring to FIG. 3, in a low-friction case, the same pressure cycle 70 is applied to the valve. A new dotted trace 76 represents a valve position as a function of time. At a time T5, the pressure is high enough to overcome friction and the valve 10 begins to move, driven by the increasing pressure. At a time T6, the pressure stops increasing and begins to decrease. As a result, the valve 10 stops moving until, at a time T7, the pressure is low enough to again overcome friction and the valve begins to move again. However, because friction is overcome much earlier in the cycle, the time between T6 and T7 during which the valve 10 does not move is very small. So, the delay between the pressure and position is much less. In this low friction case, limit cycling is likely not the cause of the cycling actuator pressure. Instead, the cause is likely loop tuning.

In response to limit cycling, the controller detects and reports any limit cycling of the valve 10. The controller detects the limit cycling by having the microprocessor 18 receive and analyze the desired valve set point, the position of the valve 10 through the position feedback signal 42, and actuator pressure through the pressure feedback signal 40. The microprocessor 18 compares the zero crossings (measurements related to average measurement) of these three values, a and thereby computes the phase relationship therebetween. Limit cycling can be identified by a 90° phase relationship between the valve position and actuator pressure. Once limit cycling is detected, the microprocessor 18 notifies the user, such as through the display 52, thereby allowing the user to take proper and timely maintenance action.

Figure 4:
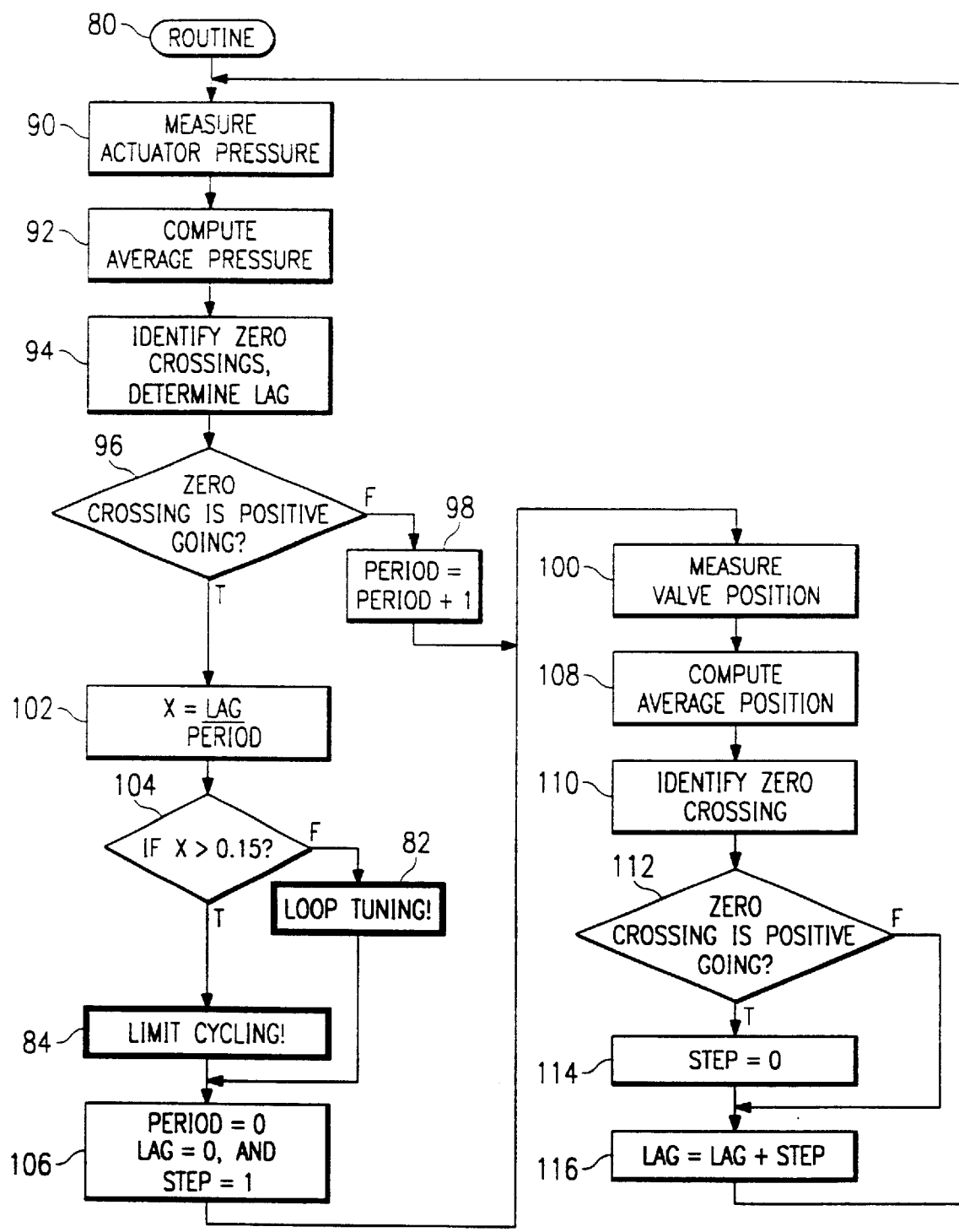
FIG. 4 is a flow diagram for a routine for reporting loop tuning or limit cycling used by the positioner system of FIG. 1.

Referring to FIG. 4, a routine 80 is repeatedly performed many times during each cycle of oscillation. The routine 80 calculates two counter values, LAG and PERIOD which are potentially incremented each iteration of the routine. The routine 80 reports either LOOP TUNING 82 or LIMIT CYCLING 84 as the cause of oscillation. If LOOP TUNING 82 is reported, which is caused by improper tuning of the process control loop, the user should adjust the process control loop tuning accordingly. If, however, LIMIT CYCLING 84 is reported, which may be caused by a high friction level of the valve 10, the user should re-pack and/or rebuild the valve 10 to alleviate such high-friction.

Execution begins at step 90, where actuator pressure is sampled. This is done by reading the pressure feedback signal 40. The actuator pressure should be proportional to the OUT signal. At step 92, an exponential average of the actuator pressure is performed.

$$\text{Average Pressure}=(\text{Old Average}*N+\text{Sampled value})/(N+1) \tag{1}$$

where N is a number which assures the average takes place over several periods. Since limit cycle periods are typically a few seconds, and since there may be 10 iterations per second, N can often be about 1000.

At step 94, the routine 80 examines the positive zero crossings of pressure and valve position. Referring to FIGS. 2 and 3, the positive zero crossings of the pressure measurement are at times T10, T12, T13, and T15. PERIOD is measured between T10 and T12 and between T13 and T15. Positive zero crossings of the position measurement are at times T11 and T14. The times for LAG are measured between T10 and T11 and between T13 and T14. In order to reduce the effect of noise, the zero crossings T10, T11, T12, T13, T14, and T15 may alternatively be defined after several successive measurements from the position feedback signal 42 and the pressure signal 40.

At step 96, a determination is made as to whether the zero crossings are positive-going. If not, at step 98, the interval timing of PERIOD is incremented and execution proceeds to step 100. Otherwise, at step 102, a value X is calculated:

$$X=\text{LAG}/\text{PERIOD}. \tag{2}$$

To further reduce the effect of noise, the value X may also be averaged. The value X provides a confidence level to the determination of the cause of the oscillation. At step 104, if X is near zero, LOOP TUNING 82 is likely the cause of oscillation. If X is >0.15, LIMIT CYCLING 84 is likely the cause of oscillation. At step 106, the values PERIOD and LAG are set to "0" and the value STEP is set to "1."

At step 100, valve position is measured through position feedback signal 42. At step 108, the position values are averaged exponentially (see Equation 1 above) and at step 110, the zero crossings are again determined. At step 112, a determination is made as to whether the zero crossings are positive-going. If so, at step 114, the value STEP is set to "0." At step 116, the value LAG is set to LAG plus STEP and execution returns to step 90. As a result, the interval timing of PERIOD increments every cycle during the period and is reset at the end of the period. The interval timing of LAG increments only when STEP is equal to "1" and is reset at the end of the period. The value "1" represents one iteration of the routine 80 for determining the counter values of LAG and PERIOD. Therefore, the value STEP acts as a switch that turns a particular counter on and off. For example, PERIOD should stop counting after the position goes to a zero crossing.

Bumpless Transfer from Manual Mode to Normal Operating Mode

The positioner 12 supports two modes of operation: a normal, automatic operating mode and a manual operating mode. In both cases a control algorithm is actually still running and positioning the valve, the difference being determined by how the valve set point is determined. Conventionally, when the valve is switched from the automatic mode to manual mode, the controller of the positioner externally "winds up", i.e., goes to a minimum or maximum output. Then, when the valve is switched back to normal operation mode, the positioner closes or opens the valve before moving it to the correct position, thereby "bumping" the valve.

For example, an external controller may be trying to match a valve position while fluid is going through the valve. The positioner 12 tries to control the flow to match a certain valve set point. If control is switched to manual mode and the flow through the valve is too high, the controller will try to change the valve set point by closing the valve a small amount. Since the valve is in manual mode, the positioning signals are ignored. The controller keeps trying to close the valve more, by increasing the signal to close the valve. Then, when the positioner 12 is switched back to normal operating mode, the close signal is recognized and the valve 12 completely closes. The controller would then recognize that the flow now is too low and start opening the valve back up. However, there would be a "bump" in the flow as the valve 10 closes and then reopens.

In the present invention, the positioner 12 provides bumpless transfer between the operating modes by preventing the valve 10 from quickly closing or opening fully after control of the valve by the positioner changes from the automatic operating mode to the manual operating mode and then back to the automatic mode. When switching from manual mode to automatic operating mode, the microprocessor 18 reads the position feedback signal 42. If the position of the valve 10 does not match the desired valve position, the microprocessor 18 waits for the user to change the controller output to match the current valve position. The valve 10 is held in its current position until the controller output is changed to match. The microprocessor 18 may notify the user, such as on the display 52, to allow the user to see how much the signal must be changed to match the current valve position.

Figure 5:
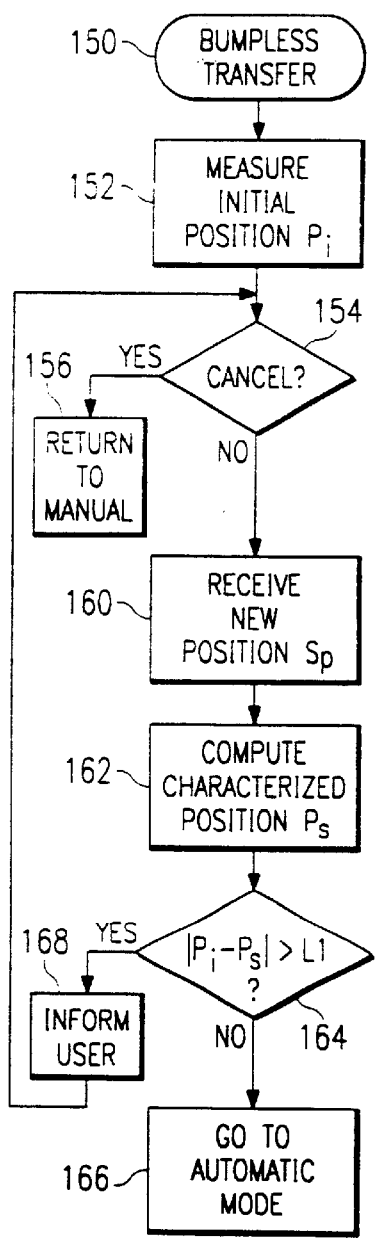
FIG. 5 is a flow diagram for a routine for bumpless transfer from manual to automatic mode used by the positioner system of FIG. 1.

Referring to FIG. 5, a routine 150 provides bumpless transfer from manual mode to automatic operating mode. The routine 150 uses an initial current position $P_i$, a characterized position $P_s$ and a set-point position $S_p$. The position value $S_p$ (input signal 54) comes from the controller. If the valve 10 has an equal percentage characteristic, the characterized position $P_s$ and set-point position $S_p$ are the same. Otherwise, a characterization function $F_c$ is used to convert the set-point position $S_p$ to the characterized position $P_s$. A characterization function defines the relationship between the input signal 54 as a percent of measured range and the actual valve position $P_i$ as a percent of range:

$$P_s=F_c(S_p). \tag{3a}$$

and inversely:

$$S_p=F_c^{-1}(P_s). \tag{3b}$$

For example, if the controller gives an input signal 54 for a set point $S_p$ of 50%, the controller converts the signal using the characterization function $F_c$ to a characterized position $P_s$ that may be 15% open, yet have a 50% flow rate.

At step 152, an initial position $P_i$ of the valve 10 is measured. At step 154, if the microprocessor 18 receives a command to cancel the bumpless transfer, execution proceeds to step 156 where control returns to manual mode. Otherwise at step 160, a desired position for automatic mode is received and converted to a set-point position value $S_p$, which represents the desired position as a percent of pre-defined calibration limits. At step 162, a characterized position $P_s$ corresponding to the position value $S_p$ is computed.

At step 164, if the difference (absolute value) between $P_i$ and $P_s$ is less than a predefined limit "L1," at step 166, operation goes to automatic operating mode. Otherwise, execution proceeds to step 168 where the controller informs the user, such as on the display 52, to allow the user to see how much the position set point must be changed to match the current valve position. The controller may also provide the user with additional information for adjusting the position set point.

In an alternate embodiment, the positioner 12 could actually adjust the valve 10 or adjust the OUT signal itself without user-intervention. The user may preselect this functionality, or can be notified after the valve has been moved.

Method to Prevent Control Routine from Failing after Windup

The spool valve 24 can either fill or exhaust air 32 to and from the actuator 26. The spool valve 24 is controlled with a pneumatic pressure that comes from the I/P transducer 22, which is controlled by the OUT signal. A signal offset value, called "BIAS." can be sent to the I/P transducer 22 to place the spool valve 24 in the center position so that the actuator 26 neither fills nor exhausts. The value of the BIAS will vary from actuator to actuator and will vary in the same actuator with temperature and other operating conditions. During normal operation of the positioner 12, a control routine (not shown) running in the controller finds and keeps track of the BIAS.

Problems often occur when the controller is constantly adjusting the BIAS to keep it correct. For example, if the valve 10 sticks in a certain position (such as when there is an obstacle in the valve or a problem exists with the air 32), the controller tries to move the valve without success. Attempting to move the valve, the controller continually adjusts the BIAS towards zero. Once the valve 10 becomes unstuck, the BIAS (which is at or near zero) is wrong. The controller must then adjust the BIAS to its proper position, which may take a long time. As a result, the valve 10 would stay closed for some length of time before the BIAS was corrected.

In response to problems such as this, the present invention intelligently monitors and adjusts the BIAS. If the actual valve position is significantly different than the desired valve position, the BIAS is not adjusted. Also, if the valve 10 is at an end point (opened or closed), the BIAS is not adjusted.

Furthermore, the controller keeps a long term average (BIAS Average) of the BIAS so that it stays relatively constant for a long period of time. If the BIAS does get adjusted incorrectly, then it is likely at a different value than the BIAS Average. Then when the controller sees that the BIAS is being adjusted toward the BIAS Average, it can adjust the BIAS very quickly.

If the valve 10 has not moved more than a predefined amount during a predefined time, and if the valve position is not near either end of its possible travel (fully opened or closed), the controller calculates a new BIAS value as:

$$\text{new BIAS} = \text{old BIAS} + C^*(\text{actual position} - \text{set position}). \quad (4)$$

where C is a predefined constant modifiable by the controller

However, if the valve 10 is constrained from moving to the position commanded by Equation 4, the controller increases or decreases the BIAS away from the proper value when the valve is unconstrained, thereby moving the valve to a wrong position. In order to avoid this failure the controller implements a BIAS analysis according to Equations 5–7 shown below:

If valve position>$L\_$lower and valve position<$L\_$upper and |position error|<$L\_$error then BIAS Average=BIAS*T+BIAS Average*(1−T). (5)

$L_{lower}$, $L_{upper}$, and $L_{error}$ are predefined limits to prevent averaging when the valve is near the open or closed position or is moving, and T is a constant used to average the BIAS over a long period of time. Position error is equal to the current set point minus the measured position.

If BIAS>(BIAS Average+C2) and position error<−E then BIAS=BIAS Average+C2. (6)

Where E and C2 are error limits defined by the controller. The effect of Equation 6 is to move the BIAS rapidly toward the average value if the position error indicates that the BIAS should move in that direction.

If BIAS>(BIAS Average−C2) and position error>E then BIAS=BIAS Average−C2. (7)

Valve Actuator Signature Procedure Embedded in a Positioner

Associated with the valve 10 is a valve signature. The purpose of the valve signature measurement is to account for the friction and hysteresis of the valve. The signature thereby serves as a diagnostic tool that can identify problems such as a broken spring or high friction.

A signature measurement is performed for each movement direction (opening or closing) of the valve. However, using the position feedback signal 42 to position the valve 10, it is possible that the valve will overshoot and thus the direction of motion will not always be in the same direction. For example, the conventional way to measure the valve signature is to put the valve at 15% and then give it a signal to go to 20%. As the valve is moving from 15% to 20%, it may open until it reaches 21% and then close to reach 20%. As a result, the valve moves in both opening and closing directions. This change in direction distorts the perceived valve signature measurements.

The present invention does not rely on position feedback to obtain the valve signature. Instead, by controlling the pressure only, it is possible to overcome this problem and get a more accurate valve signature. Continuing with the above example, the valve is positioned to 15% and the position control is turned off. Then the pressure is slowly increased. Now because there is no position feedback, the valve cannot overshoot and change directions. Instead, it can only go one direction. Position and pressure are constantly sampled during this time.

In one embodiment, the controller can be placed in a diagnostic mode and the valve signature can be measured over a large range of valve movement. In an alternate embodiment, the controller can allow a restricted range of valve movement during operation. In this alternate embodiment, if the valve is set at 45% for example, the controller can move the valve between 40% and 50% to obtain the valve signature during operation.

Figure 6A:
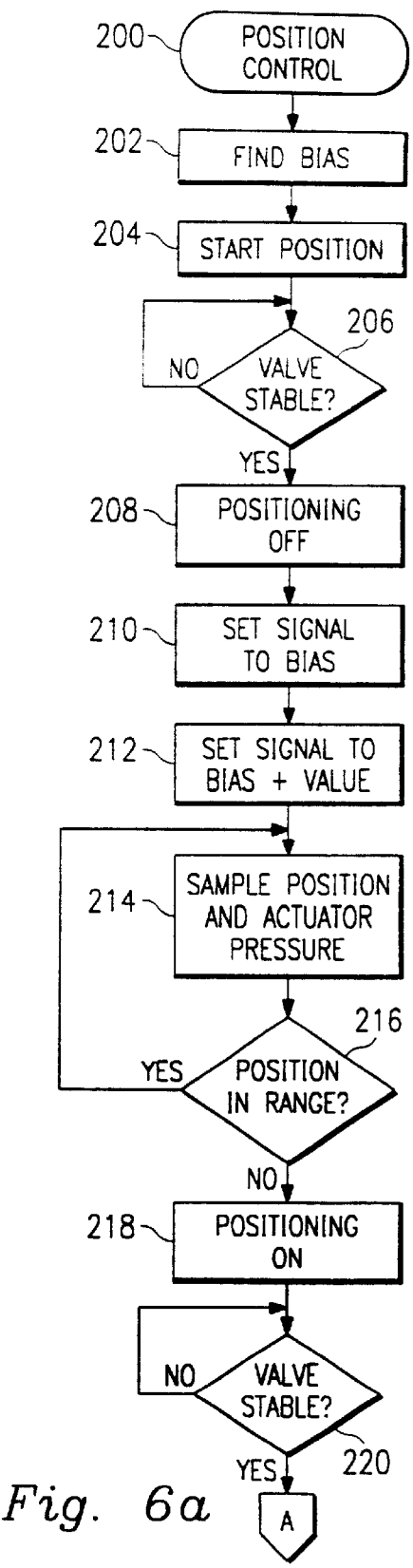
FIGS. 6a–6b are flow diagrams of a routine for performing position control used by the positioner system of FIG. 1.
Figure 6B:
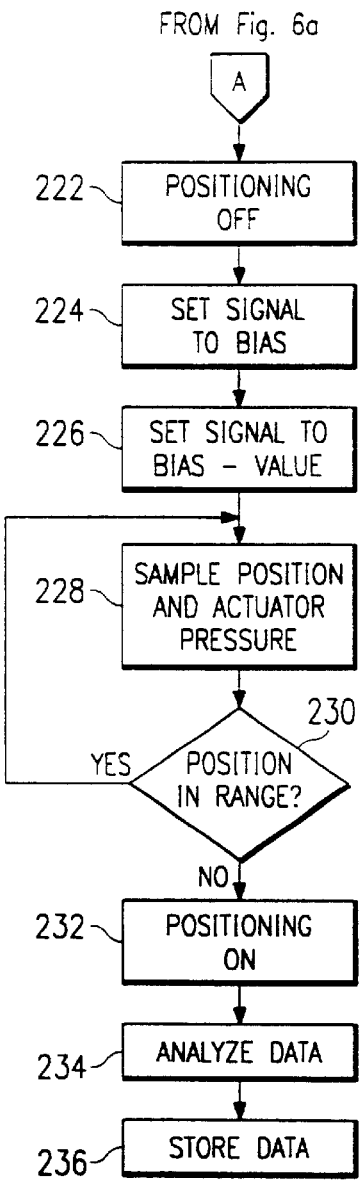

Referring to FIG. 6a, a position control routine 200 provides an accurate method to obtain the valve signature measurement. At step 202, the BIAS value is a determined.

Three alternate methods for determining BIAS are described further below with reference to FIGS. 7a–7c. Once the BIAS has been found, at step 204. the valve 10 is set to a starting position by letting the automatic operating mode adjust the pressure of the actuator 26.

At step 206, the controller waits until the valve 10 is stable at the starting location by examining either or both the pressure (through the pressure feedback signal 40) or the position (through the position feedback signal 42) until the value changes less than a predetermined amount. At step 208, automatic positioning is stopped. At step 210, the signal to the I/P transducer 22 is set to the BIAS value. At step 212, the signal to the I/P transducer 22 is set to the BIAS plus a predetermined value V1. The value V1 may be a parameter entered by the user, predefined by the program, determined from the size of the valve 10, or determined by testing the valve response.

At step 214, valve position and actuator pressure are sampled at a predetermined rate and stored in the non-volatile memory 48. This will be designated as the "pressure vs. position data set—increasing." If at step 216 the position is within a predefined test range, execution returns to step 214. Otherwise, at step 218 the automatic positioning is restarted and the valve position is set to the ending position.

At step 220, the controller waits until the valve is stable at the ending location by examining either the pressure or the position until the value changes less than a predetermined amount. At step 222, automatic positioning is stopped. At step 224, the signal to the I/P transducer 22 is set to the BIAS value. At step 226, the signal to the I/P transducer 22 is set to the BIAS value minus a value determined by another predetermined value V2. The value V2 may be equal to the value V1 or may be a parameter entered by the user, predefined by the program, determined from the size of the valve 10, or determined by testing the valve response.

At step 228, valve position and actuator pressure are sampled at a predetermined rate and stored in the non volatile memory 48. This will be designated as the "pressure vs. position data set—decreasing." If at step 230 the position is within the test range execution returns to step 228. Otherwise, at step 232 the automatic positioning is restarted and the valve position is set to the ending position.

At step 234, the data is analyzed by:
1. Calculating the spring range by fitting the two pressure vs. position data sets with straight lines and calculating where they cross 0 and 100 percent position. The spring range is the average of the values determined from the two lines. Only the data where the position is between about 10% and 90% is used.
2. Calculating the friction at a given position by interpolating the pressure vs. position data sets. The friction is 0.5 times the absolute value of the difference between the pressure determined from the pressure vs. position data set—increasing and the pressure vs. position data set—decreasing.

At step 236, the pressure vs. position data, the spring range data, and the friction data are stored in non-volatile memory 48. The pressure vs. position data, the spring range data and the friction data can be optionally sent to another processor (not shown) connected to the positioner 12. Alternatively, or in addition, the pressure vs. position data and the results of the analysis of the data can be displayed on the display 52.

Figure 7A:
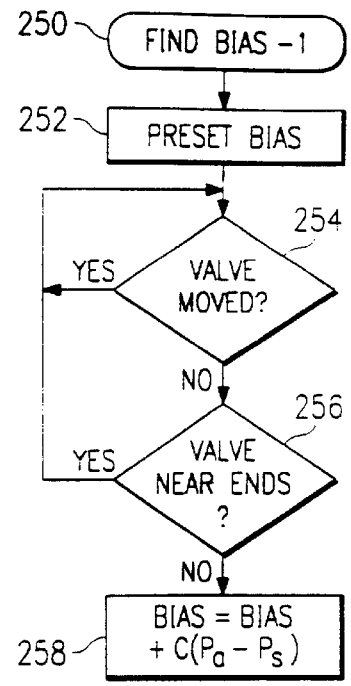
FIGS. 7a, 7b, and 7c are flow diagrams for alternate routines for finding a BIAS value used by the positioner system of FIG. 1.
Figure 7B:
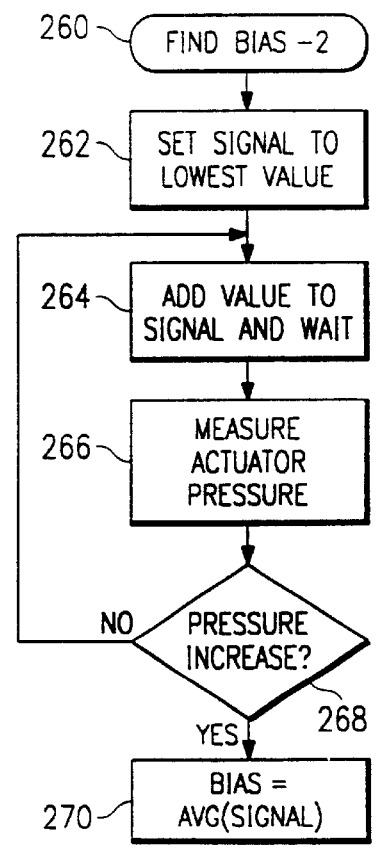
Figure 7C:
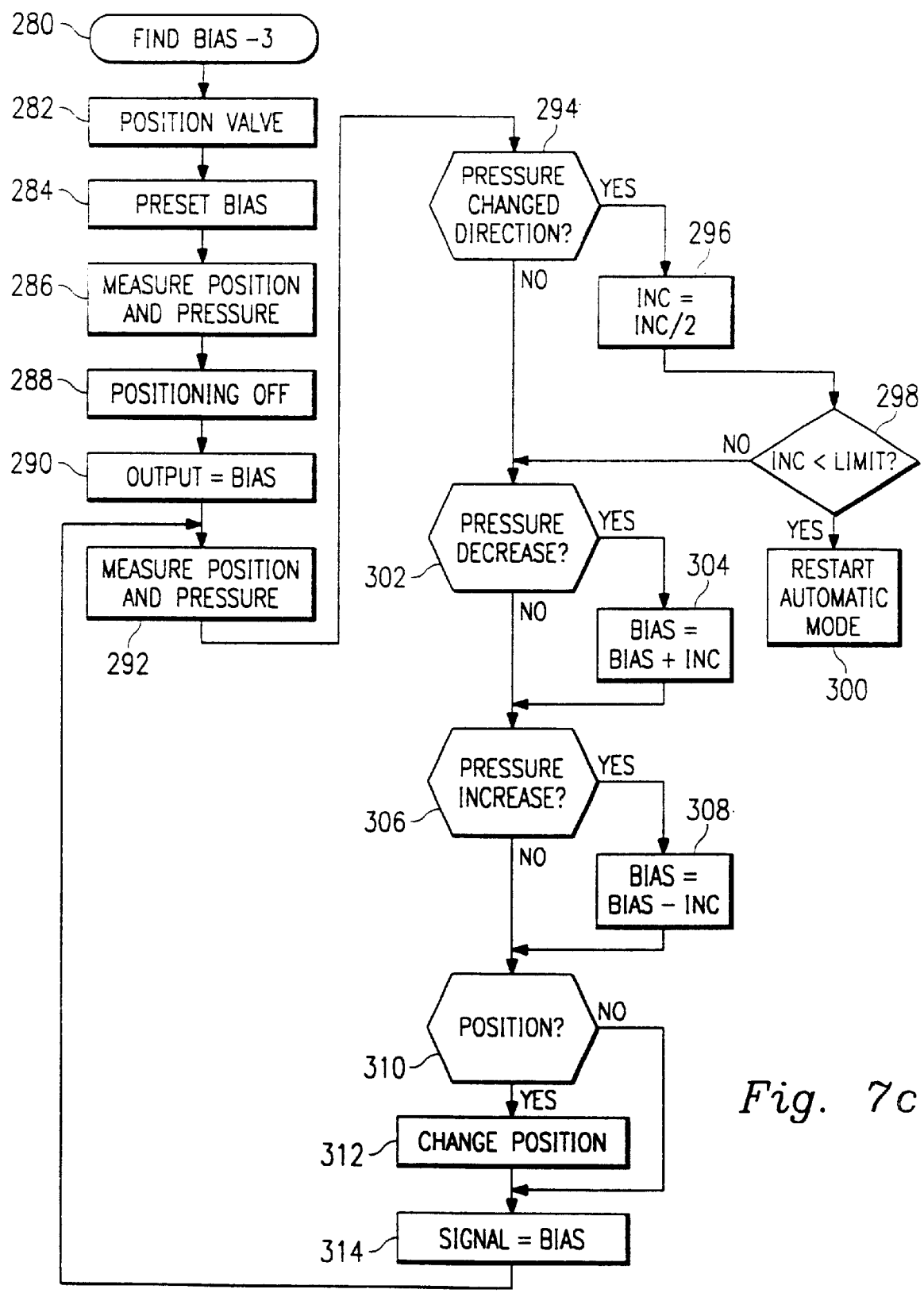

Referring to FIGS. 7a–7c, during normal operation of the positioner 12, a routine running in the microprocessor 18 finds and keeps track of the BIAS value. Three alternate routines are described in detail below.

Referring specifically to FIG. 7a, a first routine 250 may be used to find the BIAS value. At step 252, on startup of the positioner 12, the BIAS is set to a predetermined value V3 stored in non-volatile memory 48. The value V3 may be a value stored from a previous operation. At step 254, a determination is made as to whether the valve 10 has moved more than a predetermined amount during a predetermined time. If so, the routine 250 waits for the valve to become stabilized. Once the valve is stabilized, at step 256 a determination is made as to whether the a valve position is near either end of its possible travel. If so, execution returns to step 254. Otherwise execution proceeds to step 258. At step 258, a new BIAS value is computed according to Equation 4, above.

Referring specifically to FIG. 7b, a second routine 260 may also be used to find the BIAS value. At step 262, on startup of the positioner 12, the OUT signal is set to its lowest value. This signal value is stored and designated "previous signal." At step 264, a predefined value is added to the OUT signal. This signal value is stored and designated "current signal." The positioner 12 then waits for a predefined time. At step 266, the processor 18 measures the actuator 26 pressure through the pressure signal 40. At step 268, a determination is made as to whether the pressure has increased by more than a predefined amount. If not, the current signal is stored as the previous signal and execution returns to step 264. Otherwise, the BIAS value is computed:

$$\text{new BIAS} = (\text{current signal} + \text{previous signal})/2. \qquad (8)$$

The new BIAS value is stored in non-volatile memory 48.

Referring specifically to FIG. 7c, a third routine 280 may also be used to find the BIAS value. At step 282, the valve 10 is positioned at a location within 10% from the outer limits of its travel. This location is designated "middle test position." Further, a "low test position" is defined as the middle test position minus a constant and a "upper test position" is defined as the middle test position plus a constant. At step 284, a starting value for the BIAS is chosen from either a previously stored value in non-volatile memory 48 or the preset BIAS value from step 252 (FIG. 7a), above. Further, a BIAS increment constant "INC" is defined.

At step 286, the processor 18 measures the position from the position feedback signal 42 and the pressure from the pressure signal 40. At step 288, automatic positioning is stopped. At step 290, the output from the I/P transducer 22 is set to the BIAS value. At step 292, the processor 18 waits for a predefined period of time and then re-measures the position and pressure. The change in pressure is stored.

If at step 294 the pressure change is in a different direction than the last pressure change, then at step 296, the increment constant INC is divided in half. If at step 298 the new increment constant INC is less than the smallest allowed increment, execution proceeds to step 300 where automatic positioning is turned on and the BIAS value is stored in non-volatile memory 48. Upon a negative determination of either steps 294 or 298, execution proceeds to step 302.

At step 302, a determination is made as to whether the pressure has decreased. If so, at step 304 BIAS is incremented by the constant INC. Execution then proceeds to step 306 where a determination is made as to whether the pressure has increased. If so, at step 308 BIAS is decremented by the constant INC. Execution then proceeds to step 310.

At step 310, a determination is made as to whether the position is below a predetermined low limit or above a predetermined upper limit. If so, at step 312 the OUT signal is set to a value that will guarantee valve movement between the low test position and upper test position. The OUT signal will be a low value or high value depending upon the type of valve (air-to-open or air-to-close) and the action of the positioner (direct or reverse). Execution then proceeds to step 314 where the OUT signal is set to the new BIAS and execution returns to step 292.

For each of the above three Find BIAS routines 250, 260, 280, on a periodic basis, or by digital command, the new BIAS is saved in the non-volatile memory 48 for use on startup.

Valve Diagnostic over a Limited Position Range

Conventionally, valve diagnostics are run when a valve positioning process is not running or the valve has been bypassed. In contrast, the present invention provides valve diagnostics, including a valve signature test and a step response test, that can run while the positioning process is running. In particular, the tests are run over a restricted position range so that they can be used for predicting valve problems before they happen and before the automatic positioning process must be stopped.

Figure 8:
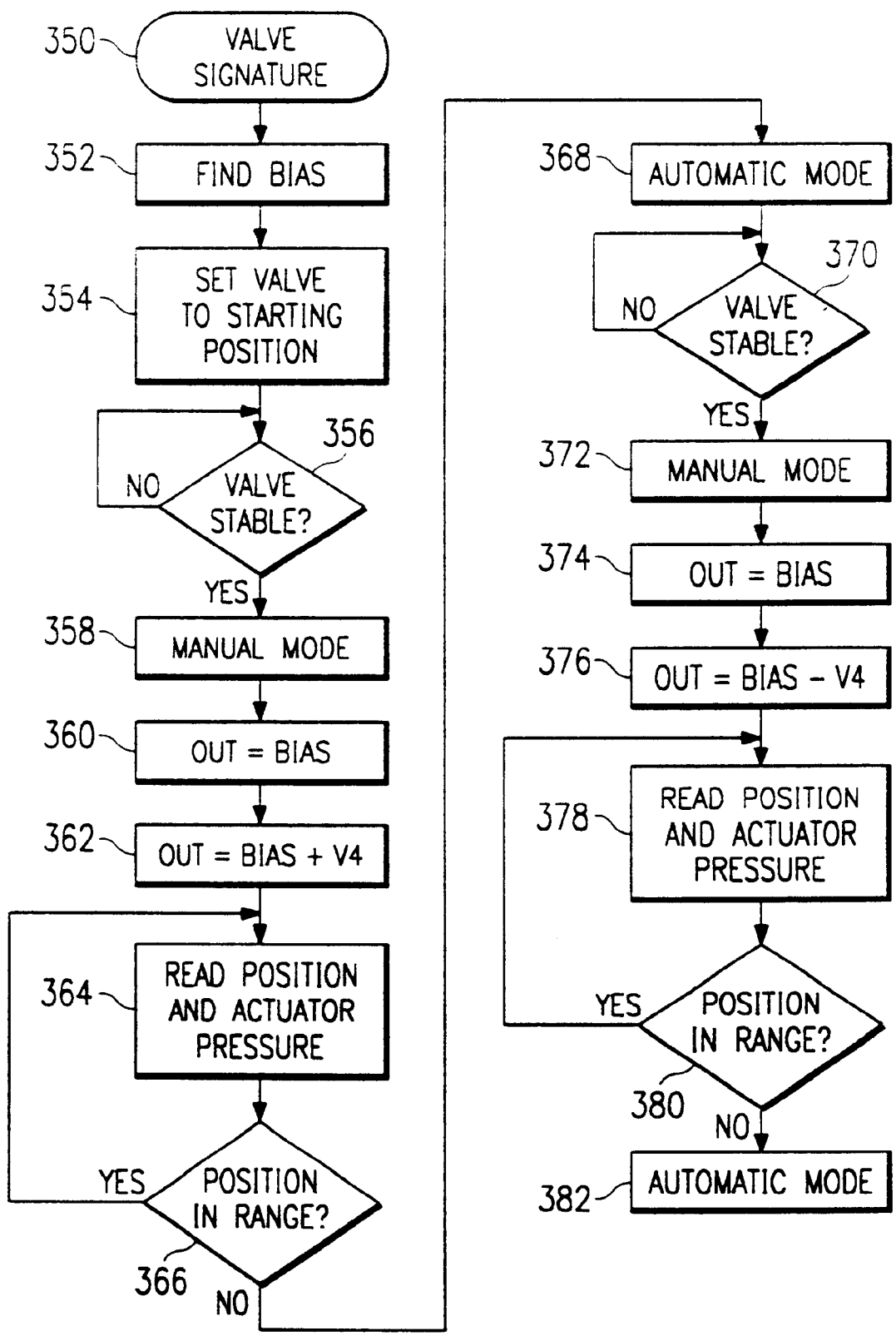
FIG. 8 is a flow diagram for a routine for determining a valve signature used by the positioner system of FIG. 1.

Referring to FIG. 8, a valve signature test 350 can be performed while the valve 10 is operating. At step 352, the BIAS value is found (e.g., using Find BIAS routines 250, 260, 280 above). At step 354, the valve 10 is set to a starting position of the test by letting automatic positioning adjust the actuator pressure. At step 356, the positioner 12 waits until the valve 10 is stable at the starting position by examining the pressure via the pressure sensor signal 40 and/or the position via the position feedback signal 42 until the value changes less than a predetermined amount. At step 358, automatic positioning is stopped. At step 360, the OUT signal is set to the BIAS value. At step 362, the OUT signal is set to the BIAS value plus a predetermined value V4. The predetermined value V4 can be a parameter entered by the user, predefined by the program, determined from the size of the valve, or determined by testing the valve response.

At step 364, the position and actuator pressure are sampled at a predetermined rate. This data, which is designated "pressure vs. position data set—increasing" is stored in memory. At step 366, if the position of the valve is within the test range, execution returns to step 364. Otherwise, at step 368, automatic positioning is restarted and the position of the valve is set to the ending position. At step 370, the positioner 12 waits until the valve 10 is stable at the ending location by examining either the pressure or the position until the value changes less than a predetermined amount.

At step 372, positioning is stopped. At step 374, the OUT signal is set to the BIAS. At step 376, the OUT signal is set to the BIAS value minus the predetermined value V4. At step 378, the position and actuator pressure are sampled at a predetermined rate. This data, which is designated "pressure vs. position data set—decreasing" is stored in memory.

At step 380, a determination is made as to whether the position is within the test range. If so, execution returns to step 378. Otherwise, at step 382 positioning is restarted and the position is set to the ending position.

Upon completion of the valve signature test 350, the stored data can be a analyzed. First of all, the spring range (for spring 66) can be calculated by plotting two pressure vs. position data sets (increasing and decreasing) with straight lines and calculating where they cross the 0 and 100 percent positions. The spring range is the average of the values determined from the two lines. Only the position data between 10% and 90% is used.

Also, the valve friction at a given position can be calculated by interpolating the pressure vs. position data sets. The friction is half the absolute value of the difference between the pressure determined from the pressure vs. position data set—increasing and the pressure vs. position data set—decreasing. The pressure vs. position data, the spring range data, and the friction data may be stored in the non-volatile memory 48, may be sent digitally to an external processor connected to the positioner 12, or may be graphically shown on the display 52.

Figure 9:
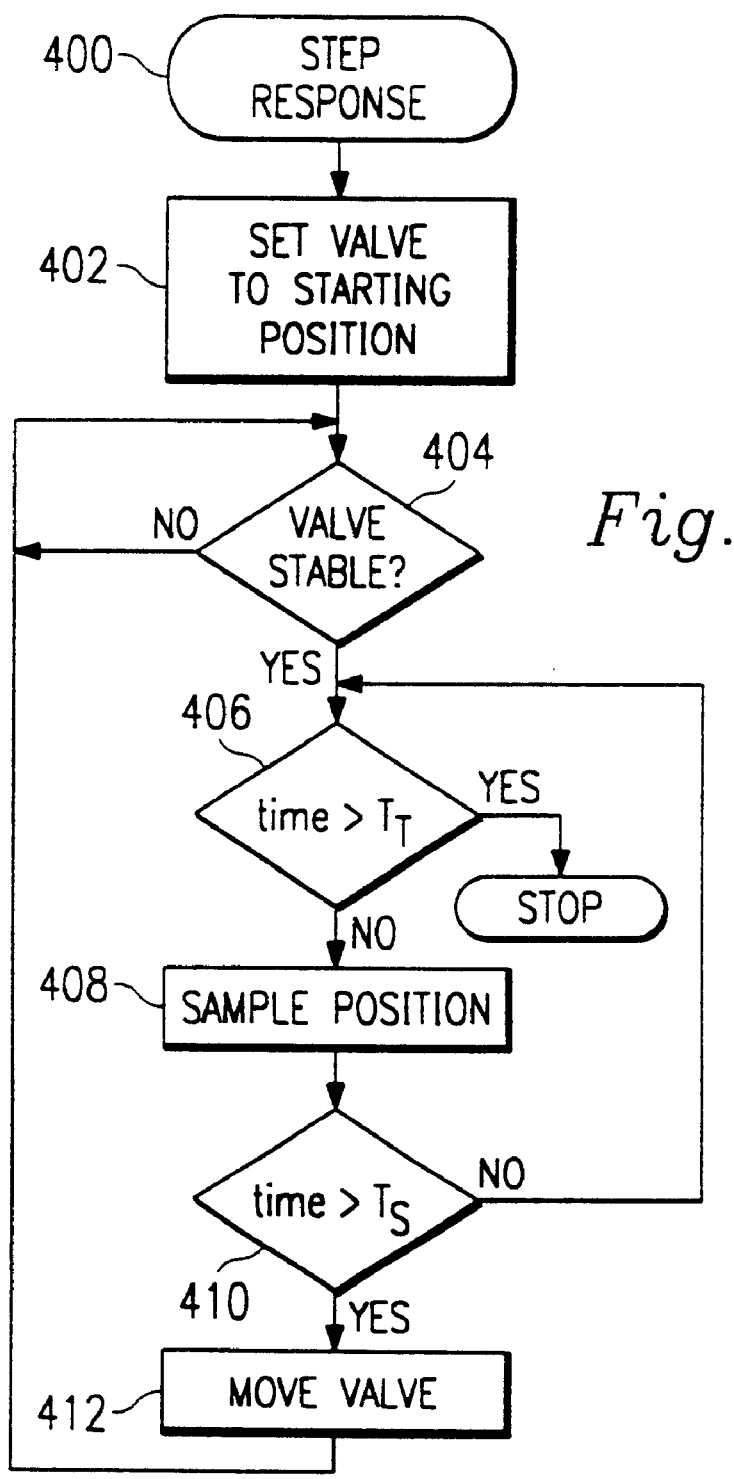
FIG. 9 is a flow diagram for a routine for determining a valve step response used by the positioner system of FIG. 1.

Referring to FIG. 9, a step response test 400 can also be performed while the valve 10 is operating. At step 402, the valve 10 is set to a starting position by letting the automatic positioning routine adjust the actuator pressure. At step 404, the positioner 12 waits until the valve 10 is stable at the starting position by examining either the pressure via the pressure sensor signal 40 and/or the position via the position feedback signal 42 until the value changes less than a predetermined amount.

At step 406, a determination is made as to whether a predefined time $T_T$ of position sampling has elapsed. If so, the routine stops. Otherwise at step 408, the position is sampled at a fixed rate and the corresponding time and position are stored in memory. At step 410, a determination is made as to whether another intermediate time Ts has elapsed. If so, at step 412 the positioner 12 commands the automatic positioning routine to move the valve to the end position and execution returns to step 404. Otherwise, execution returns to step 406.

Once the step response test 400 has completed, or intermediately during the test, the measured data may be stored in the non-volatile memory 46, may be sent digitally to an external processor connected to the positioner 12, or may be graphically shown on the display 52.

Valve Response Feedback about the Process Controller

When a program is running in the positioner 12, the positioner provides feedback to a user that indicates valve response. The user is given visual feedback of the valve operation, which is easy to identify, understand, and diagnose. For example, if the valve 10 is at 15% (assuming the valve has an equal percentage characterization) and the controller sends a signal to move to 50%, then the valve will move accordingly. The positioner 12 displays a graph on display 52 that indicates both the valve position $P_{act}$ and the characterized position $P_s$. The characterization function $F_c$ defines the relationship between the input signal (input signal 54) as a percent of measured range and the desired valve position as a percent of range according to Equations 3a and 3b, above. Ideally, the position $P_{act}$ and characterized position $P_s$ should always match. If not, something may be wrong with the valve. It is desirable to graphically display data that will help the user know when the valve 10 is operating properly.

Figure 10A:
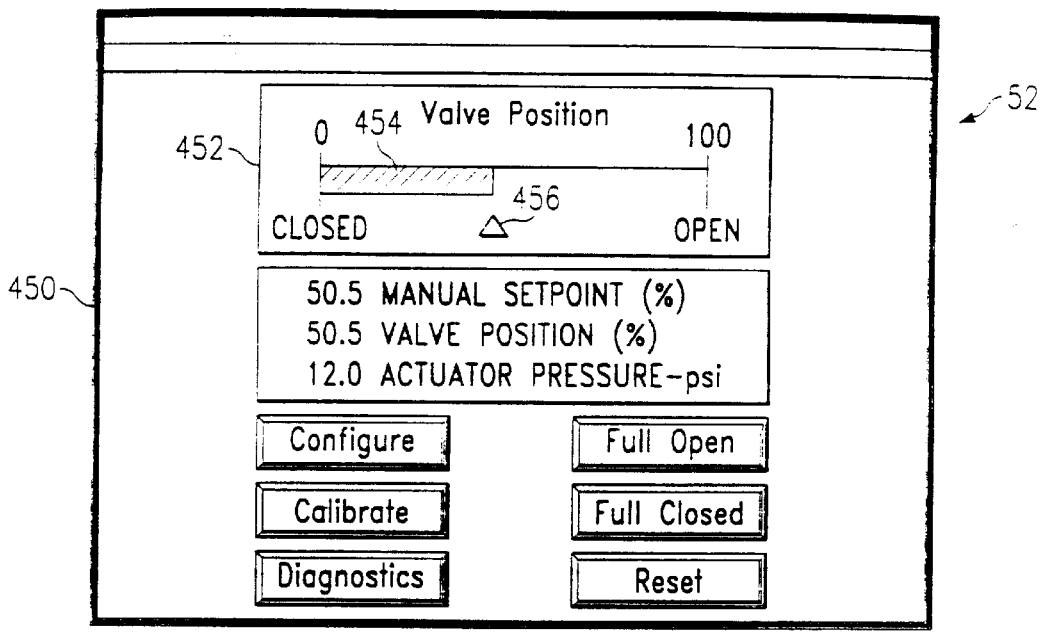
FIGS. 10a–10b are screen displays with graphs for analyzing valve response feedback to the process controller of FIG. 1.

Referring to FIG. 10a, for the sake of example, a window 450 may be shown on the display 52. A valve set point $S_p$ of 50.5% is desired. The window includes a graph 452 that shows a valve position value 454 from the position feedback signal 42 and the characterized valve position 456 ($P_s$). The characterized valve position 456 is determined by the characterization function $F_c$ of the valve set point (see Equation 3a, supra). By using the characterized position value 456, the values 454 and 456 can be plotted using the same scale and if they align, the user can quickly and easily determine that the valve is operating correctly.

Figure 10B:
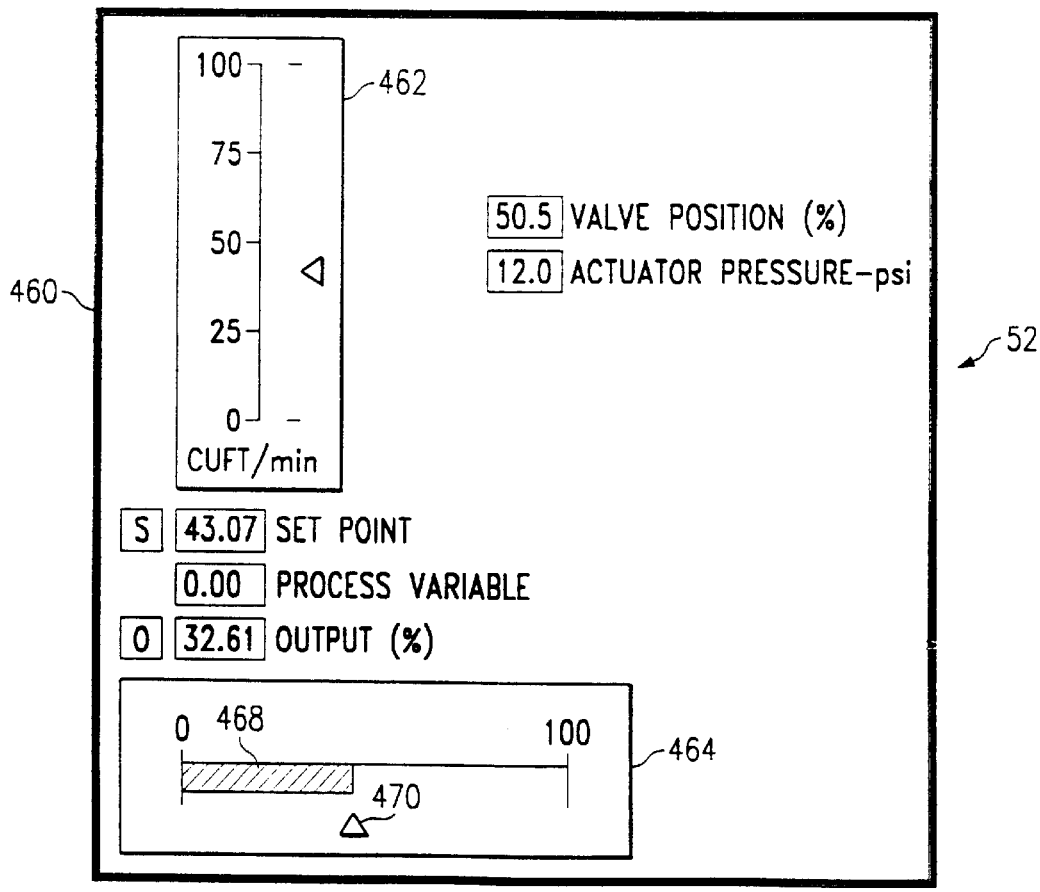

Referring to FIG. 10b, in another example, a window 460 may be shown on the display 52. The window includes a graph 462 that indicates flow rate in cubic feet per minute (cfm). A flow rate of 43.07 cfm is desired. A second graph 464 shows a controller output value 468 ($S_p$) and an inverse characterized valve position value 470. The inverse characterized valve position value 470 is determined by the inverse characterization function $F_c^{-1}$ of the position feedback signal 42 (see Equation 3b, supra). By using the inverse characterized position value 470 instead of the actual valve position provided by the feedback sensor 46, the values 468 and 470 can be plotted using the same scale and if they align, the user can quickly and easily determine that the valve is operating correctly.

Valve Positioner with Automatic Compensation for Stem Twist

Figure 11:
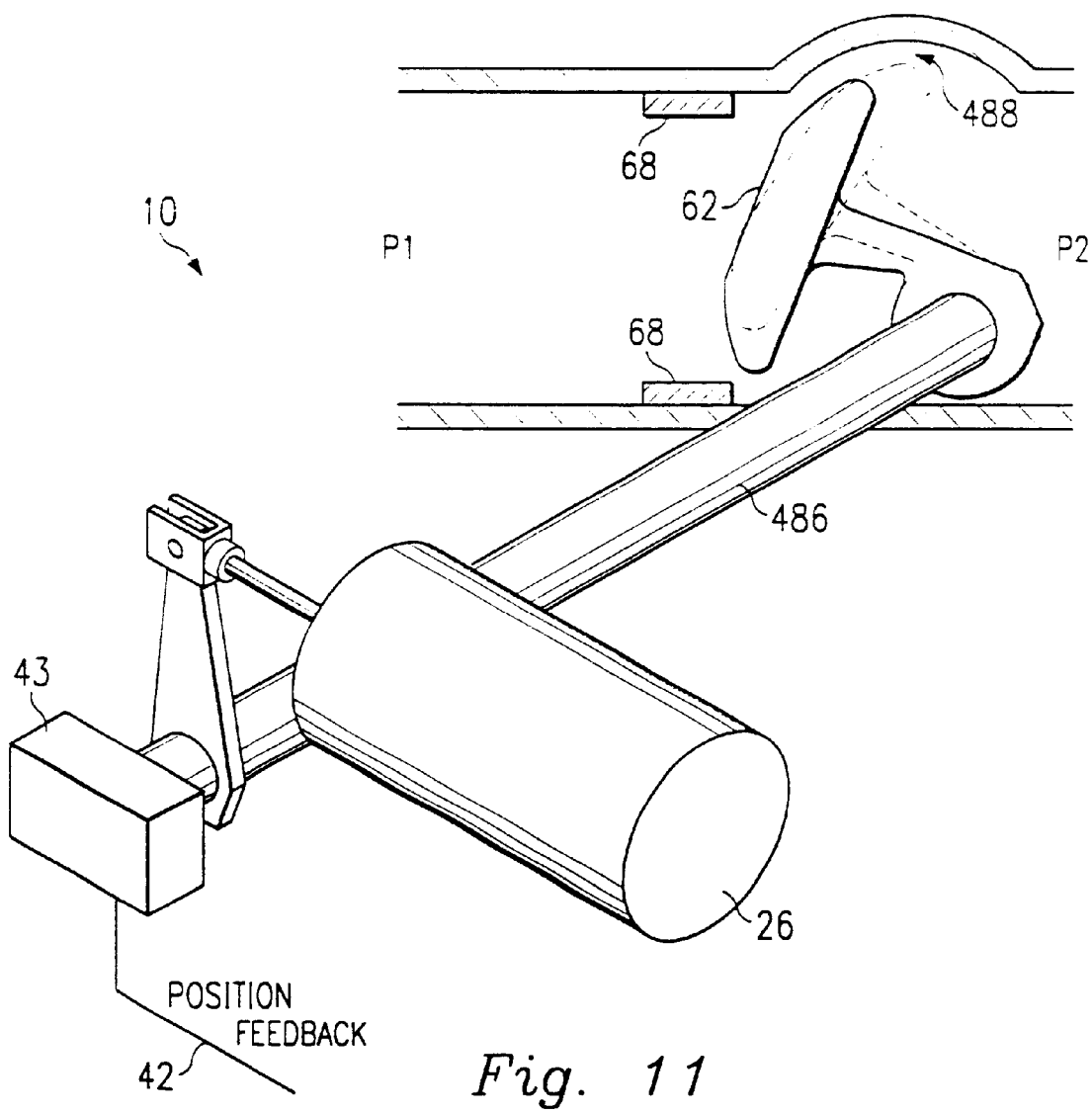
FIG. 11 is a partial, detailed diagram of one embodiment of a rotary valve controlled by the positioner system of FIG. 1.

Referring to FIG. 11, one embodiment of the valve 10 is shown to include a shaft 486 about which the plug 62 rotates. For the sake of example, the valve 10 is shown to be a flow to open valve, it being understood that other types of valves may be used. Two pressures, P1 and P2 are identified, pressure P1 being in front of the valve 10 and pressure P2 being behind the valve. Because of a pressure difference (P1–P2) from the fluid across the valve plug 62, there may be a difference between the desired position of the valve plug and the actual position of the valve plug due to twist in the valve shaft. The displaced position of the valve plug 62 is represented by the dotted line plug 488. This is particularly undesirable when the valve 10 is nearly closed and/or the pressure difference P1–P2 is at its maximum, thereby limiting the usable control range of the valve. Also, since the position sensor 46, which in the present embodiment is a potentiometer, measures from the valve shaft 486, it may not represent a true position, such true position being especially critical when the valve 10 is nearly closed.

Initially, the positioner 12 is calibrated with no process forces acting on the valve plug 62. The plug position versus actuator pressure is determined by calculating the displacement:

$$\text{Displacement} = F_D(\text{Actuator Pressure}). \quad (9)$$

$F_D$(Actuator Pressure) can be determined experimentally and the function can be performed by the microprocessor 18. The torque applied to the valve shaft 486 is directly proportional to the actuator pressure. Further, a gradient for the shaft 486 is factored into the function $F_D$.

For example, a table of tested values can be stored in non-volatile memory 48. For a given valve type, size and flow direction, the gradient (angular displacement vs. valve plug force) is determined. The difference between the pressure under no force and actual force divided by the gradient is proportional to the twist.

Once the function $F_D$ is determined, the position of the valve shaft 486 is corrected based on the estimated twist according to the following equation:

$$\text{True Position} = \text{Position Feedback Signal (42)} + F_D(\text{Actuator Pressure}). \quad (10)$$

As a result, the present invention compensates for any twist of the valve shaft 486, such as is due to process fluid forces acting on the valve plug 62. This twist, which causes a difference between the position as measured at one end of the shaft and the actual position of the valve plug, would otherwise cause inaccurate position measurements.

Nonlinear Comprehensive Valve Position Control Routine

Typically, the control valve 10 is a nonlinear, asymmetric system. For example, it may be desirable to position the valve at 10%. In furtherance of the example, the air supply 32 has a supply pressure of 20 psi and an operating range from 3 to 16 psi. Four psi is required for the actuator 26 to position the valve 10 at 10%. Since the supply pressure for the air supply 32 is at 20 psi, then a driving force for the actuator is 16 psi (20 psi–4 psi). As a result, the valve will open very fast because of the large driving force.

Continuing with the example, 14 psi is required for the actuator 26 to position the valve 10 at 90%. The driving force for this scenario is 6 psi (20 psi–14 psi). As a result, the valve will open very slowly because of the small driving force. This is only one example of how and why the control valve 10 is nonlinear.

If linear control is implemented on the valve 10, valve performance would be inconsistent. A control algorithm such as that of the present invention compensates for the nonlinearities to achieve uniform performance over a wide range of position (from 0 to 100 percent). The control algorithm provides three methods to compensate for the nonlinearities of the control valve 10 and provides a constant loop gain K. The gain K for the controller is the overall steady-state gain, and is the ratio of change of steady-state output to a step change in input. First, two separate intermediate steady-state gains are used. Each separate steady-state gain is a ratio used in the I/P transducer 22 when converting the OUT signal to the air signal for the spool valve 24. One gain $P_F$ is used when the actuator 26 is filling and the other gain $P_E$ is used when the actuator is exhausting.

Second, an adjustable gain β for the controller accounts for position errors resulting from changes in movement in the actuator 26 diaphragm (not shown) which varies with direction and with position (e.g., almost closed vs. almost open).

Third, a position compensation factor γ for the controller accounts for changes in the air volume of the actuator 26, which causes different behavior of the actuator. A coefficient $\gamma_E$ is used to compensate when the air is exhausting and a coefficient $\gamma_F$ is used to compensate when the air is filling.

Figure 12:
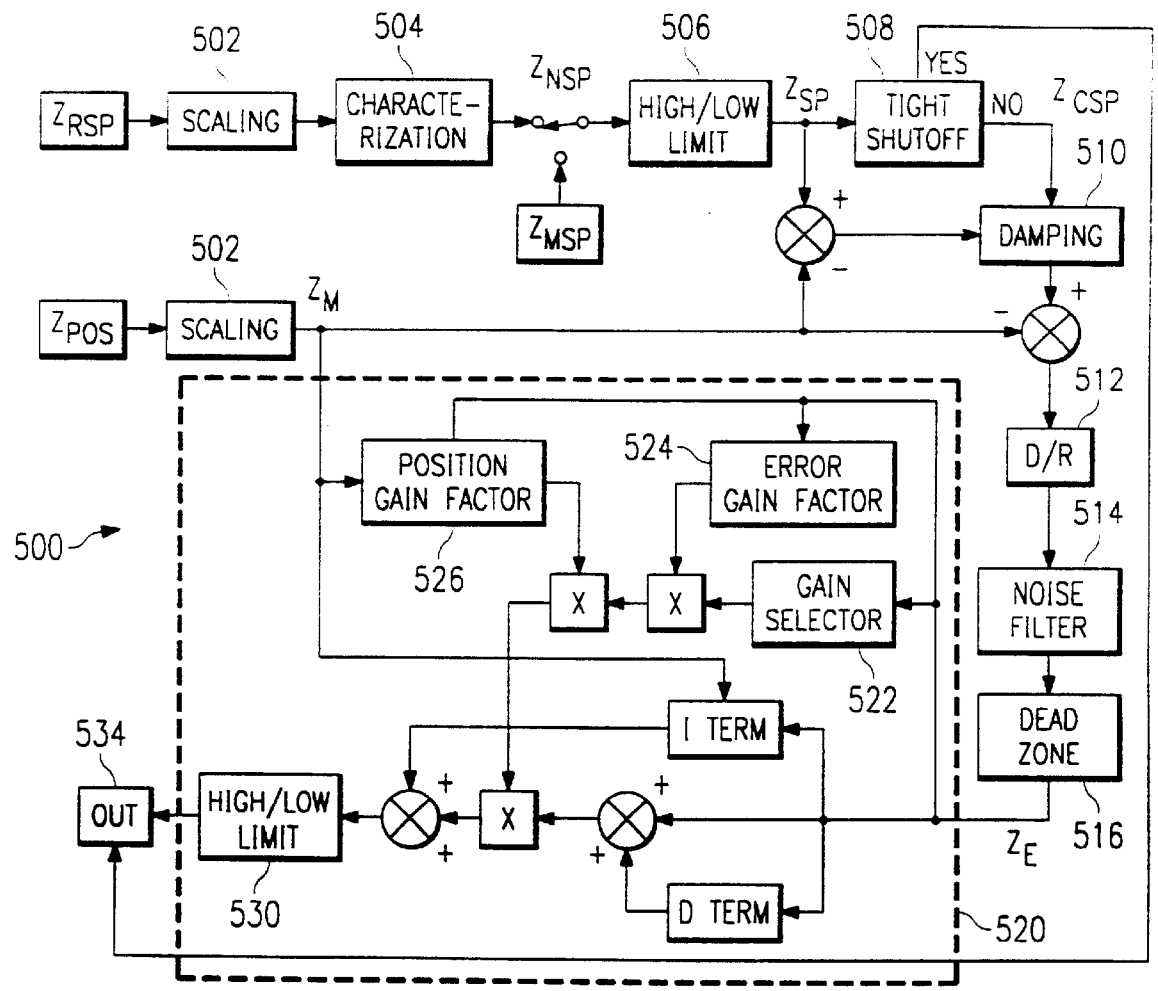
FIG. 12 is a flow diagram for a valve position control routine used by the positioner system of FIG. 1.

Referring to FIG. 12, a valve position control routine 500 uses the separate gains $P_F$, $P_E$ for both moving directions of the valve 10, applies the adjustable gain β to compensate for both error size-related and valve position-related nonlinearities, and the position compensation factor γ to provide an adjustable deadzone to deal with valve stick-slip problems. A damping coefficient is also used for adjustment of customer-desired valve response speed, and a steady-state integral control is integrated into the routine to minimize steady-state position error and hysteresis caused by numerous factors, without an adversely effect on dynamic responses. The routine 500 also minimizes the deadband, eliminates limit cycling, and maximizes dynamic responses for high friction valves with a stick-slip movement, as discussed in greater detail below.

There are several distinctive features provided by the routine 500: it provides a special non-linear gain compensation equation which is reliable and easy to apply, particularly with regard to its application to error-related and position-related valve nonlinearities: it creates a steady-state integral control scheme to minimize steady-state position errors and stick-slip movement; it uses a deadzone to deal with high-friction valve stick-slip behavior; and it controls the valve independently in both open and close directions to achieve uniform performance or custom desired performance.

The valve position control routine 500 receives a position remote set point ($Z_{RSP}$) from the microprocessor 18. The remote set point $Z_{RSP}$ is similar to the set point position $S_p$ of Equation 3, supra. At step 502, $Z_{RSP}$ is scaled, if necessary, to a standard range and at step 504 is characterized using a characteristic function $F_c$ to produce a position normal set point ($Z_{NSP}$). The position normal set point $Z_{NSP}$ is similar to the characterized position $P_s$ of Equation 3, supra. The valve characterization step 504 is used for gain compensation of the process control loop and is important in obtaining uniformity of control performance under a wide range of operation. Gain compensation provides adjustment of the controller gain K due to the gain changes of other components in the control loop. The position control routine 500 selects the $Z_{NSP}$ if the positioner 12 is in the normal (or automatic) operating mode. Otherwise, the routine selects position manual set point ($Z_{MSP}$) for manual mode.

A High/Low Limit step 506 checks the selected position set point ($Z_{MSP}$ or $Z_{NSP}$) if High/Low Limit flags are set, and limits the set points accordingly. The High/Low Limit flags allow the customer to configure a desired operation range for the valve 10. The customer may also set a tight shutoff flag for the valve 10. If at step 508 the tight shutoff flag is set and the position set point ($Z_{SP}$) drops below the tight shutoff position (e.g., 5%), the routine 500 sets the OUT signal either at its high or low limit to produce the maximum force to shut the valve off. A tight shutoff deadzone, typically 0.5 to 1%, is used to avoid trivial valve movement near the tight shutoff position. The valve 10 will stay fully closed until the set point exceeds the tight shutoff position plus a tight shutoff deadzone (e.g., 5%+0.5%).

A damping step 510 is used to manipulate the valve response speed by calculating a position current set point ($Z_{CSP}$) with an adjustable damping coefficient ($\alpha$) or fixed damping coefficient ($\alpha_0$) described in the following equation:

$$Z_{CSP}(t)=\alpha Z_M(t)+(1-\alpha)Z_{SP}(t), \text{ when } abs(Z_{SP}-Z_M)>\Delta Z_D=\alpha_0 Z_M(t)+(1-\alpha_0)Z_{SP}(t), \text{ when } abs(Z_{SP}-Z_M)\leq\Delta Z_D \quad (11)$$

where $$0\leq\alpha<1, 0\leq\alpha_0<1 \quad (12)$$

t=time, sec
$Z_M$=measured valve position, %
$Z_{SP}$=valve position set point, %
$\Delta Z_D$=valve response damping deadzone, %

There is no damping with $\alpha=0$, and maximum damping when $\alpha$ approaches 1. If fast valve response is desirable, the damping coefficient should be set at zero (no damping). It is important to limit the damping (set $\alpha_0=0$ or close to 0) in a damping deadzone (typically 0.3 to 1%) so the performance accuracy and deadband will not be degraded.

In the alternative, Equation 11 may be rewritten to use the damping coefficient in integer format as follows:

$$Z_{CSP}(t)=[\alpha Z_M(t)]/10+[(10-\alpha)Z_{SP}(t)]/10, \text{ when } abs(Z_{SP}-Z_M)>\Delta Z_D = [\alpha_0 Z_M(t)]/10+[(10-\alpha_0)Z_{SP}(t)]/10, \text{ when } abs(Z_{SP}-Z_M)\leq\Delta Z_D \quad (13)$$

where $$0\leq\alpha\leq9, 0\leq\alpha_0\leq9 \quad (14)$$

Position error is equal to the current set point minus the measured position. Depending on whether the valve-actuator system is direct or reverse acting, the sign of the error may have to be reversed in step 512 so that the position control is always a negative feedback loop.

At step 514, a noise filter is designed to filter out the position error noise. The position errors are averaged if the noise contains a significant portion of periodic noise. An appropriate deadzone (e.g., 0.03 to 0.08%) based on the noise level may also be applied to filter out the noise.

At step 516, a deadzone is designed to deal with the stick-slip behavior of the valve movement, which is typical if the valve 10 is a high friction valve. The high friction in valve stem 64 movement sometimes results in a stick-slip behavior because the static friction is higher than the dynamic friction. The high friction and stick-slip behavior may result in slow response, high hysteresis plus deadband, and/or limit cycling of valve movement. If the valve 10 is a low friction valve without stick-slip behavior, the deadzone will be zero.

Next, a non-linear proportional-plus-derivative-plus-steady-state integral (PD-SSI) routine 520 is performed. The PD-SSI routine 520 uses a non-linear proportional-plus-derivative control to quickly set the valve 10 position at or near its set point, then turns on a special steady-state integral control to eliminate or minimize the steady-state error. Using the PD-SSI routine 520, the hysterisis (plus deadband) of a high friction valve may be reduced significantly to 0.05–0.3% while a fast dynamic response can still be achieved. The deadzone is therefore set (at step 516) to provide minimum valve movement resolution, so when the valve 10 is moved into this minimized deadzone, the controller stops manipulating its output to avoid a possible limit cycling.

The PD-SSI routine 520 may be expressed in the Laplace transform as follows:

$$\text{OUT}(s)=K[1+\text{DTERM}]+\text{ITERM} \quad (15)$$

OUT(s)=controller output in the Laplace transform
K=gain
ITERM=BIAS(s) balance output in the Laplace transform $$DTERM = Z_E(s)\frac{T_D K_D S}{K_D + S}$$

$K_D$ = derivative gain, typically 8~16 sec$^{-1}$ $T_D$ = derivative time $Z_E(s)$ = position error in the Laplace transform The non-linear gain K will be discussed in detail below.

Conventional, non-integral control routines have inherent steady-state errors or offsets. These steady-state errors will be affected by numerous factors such as ambient temperature and aging effects, which may affect component characteristics. The steady-state errors, if significant, will result in reduced capacity or poor shut-off, which calls for field calibration and adjustment. In contrast, integral control is effective in eliminating these steady-state errors and therefore reduces the accuracy and linearity requirement of various components such as the I/P transducer 22 and the spool valve 24.

However, integral control tends to cause position overshoot and limit-cycling as well as wind-up. In order to make full use the advantages of integral control and at the same time avoid its disadvantages, the PD-SSI routine 520 uses a steady-state integral control, which is turned off during a transient response and when the valve 10 is at or near the fully closed and fully open position, and turned on when in steady-state. The integral control used in the PD-SSI routine 520 can be expressed as follows:

$$BIAS(t) = BIAS(t - n\Delta t) + \frac{P_F Z_E n\Delta t}{T_1} \quad (16)$$

$P_F$=proportional gain in air filling operation for single-acting actuator, and for open operation for double-acting actuator $T_I$=interval time $n\Delta T$=integral control calculation period $Z_E$=position error after the noise filter (step 514) and adjusted for dead zone (step 516).

The above equation is executed only when the following conditions are all satisfied:

$$0.3\text{~}1\% \leq Z_M(t) \leq 98\text{~}99.7\% \quad (17)$$

$$0.3\text{~}1\% \leq Z_{SP}(t) \leq 98\text{~}99.7\% \quad (18)$$

$$\text{abs}[Z_E(t) - Z_E(t - k\Delta t)] \leq 0.1\text{~}0.2\%, \text{ for } k=1,2,\ldots,m \quad (19)$$

$$n\Delta t = 3\text{~}10 \text{ sec} \quad (20)$$

The time interval $T_I$ should be set at a reasonably large value (typically 0.3 to 2.0 seconds), so the integral control is only turned on when the valve 10 is at or near a steady-state. The integral control is executed after a much larger interval $n\Delta T$ than the position routine calculation period ($\Delta T$), considering the larger amount of time needed for changing the actuator pressure to overcome valve friction when position $Z_E$ is near zero. This helps to prevent limit-cycling. A nonlinear integral control, which has more action for larger error, may be desirable to decrease large steady-state error more quickly at valve startup, or during sudden changes in environment such as ambient temperature and vibration.

Valve control is inherently nonlinear. In the PD-SSI routine 520, the nonlinear gain K is used to compensate for these inherent nonlinearities. The following description is based on the assumption that an increase of controller output will result in air filling the actuator 26 for a single acting actuator or valve open for a double acting actuator. However, it also applies to the opposite situation with some straightforward modification in the following related equations.

The controller gain K can be expressed by:

$$K = f(\beta, Z_E) f(\gamma_F, Z_M, Z_E) P_F \text{ when } Z_E \geq 0 = f(\beta, Z_E) f(\gamma_E, Z_M, Z_E) P_E \text{ when } Z_E \leq 0 \quad (21)$$

where:

$f(\beta, Z_E)$=non-linear error size related gain factor $f(\gamma_E, Z_M, Z_E)$=non-linear position related gain factor in air exhausting operation for single-acting actuator, and in close operation for double-acting actuator $f(\gamma_F, Z_M, Z_E)$=non-linear position related gain factor in air filling operation for single-acting actuator, and in open operation for double-acting actuator $P_E$=proportional gain in air exhausting operation for single-acting actuator, and in close operation for double-acting actuator $P_F$=proportional gain in air filling operation for single-acting actuator, and for open operation for double-acting actuator $\beta$=error size related non-linear coefficient $\gamma_E$=position related non-linear coefficient in air exhausting operation for single-acting actuator, and in close operation for double-acting actuator $\gamma_F$=position related non-linear coefficient in air filling operation for single-acting actuator, and in open operation for double-acting actuator $Z_E$=scaled version of a manual position value $Z_{POS}$.

If the actuator 26 is a spring-diaphragm actuator, the speed of air filling the actuator depends on air supply pressure, while the speed of air exhausting the actuator is independent of air supply pressure. This results in quite different responses in open and close direction if a single proportional gain is used. To compensate for this asymmetric behavior, and make both the open and close responses independently adjustable, separate proportional gains are used in this routine to control both open and close valve responses independently. A gain selector step 522 automatically determines which gain should be used based on the direction of the value movement. In addition, if the actuator 26 is a double-acting actuator, it is often desirable to use different gains to manipulate the open and close responses independently.

At step 524, an error size related non-linear gain factor is used to compensate the gain, caused by, for example, a nonlinear spring-like diaphragm force in the actuator 26 or valve 10. The following type gain compensation equation is used:

$$f(\beta, Z_E) = \frac{(1-\beta) + \beta \max(20\%, \text{abs}(Z_E))}{(1-\beta) + \beta |Z_E^{ref}|} \quad (22)$$

$$0 \leq \beta < 1 \quad (23)$$

When $\beta$ is 0, the factor f is equal to 1.0 and controller gain K is independent of error. The larger the $\beta$, the larger the controller gain non-linearity. A typical 2% to 6% medium size error may be used as reference error in the above equation. At reference error, the non-linear factor is always 1.0.

A corresponding gain compensation equation in integer format may be desirable for saving calculation time and memory:

$$F(\beta^0, Z_E) = \frac{(10-\beta) + \beta \max(20\%, \text{abs}(Z_E))}{(10-\beta) + \beta Z_{ref}} \quad (24)$$

The $\beta^0$ is confined to a range of 0 to 9. If a reference error of 5% is selected, the non-linear gain factor can be illustrated as in Table 1.

TABLE 1

| | $f(\beta^0, Z_E)$ | | | | |
|---|---|---|---|---|---|
| $\beta^0$ | $|Z_E| = 0\%$ | $|Z_E| = 5\%$ | $|Z_E| = 10\%$ | $|Z_E| = 20\%$ | $|Z_E| > 20\%$ |
| 0 | 1.00 | 1.00 | 1.00 | 1.00 | 1.00 |
| 2 | 0.988 | 1.00 | 1.01 | 1.04 | 1.04 |
| 4 | 0.968 | 1.00 | 1.03 | 1.10 | 1.10 |
| 6 | 0.930 | 1.00 | 1.07 | 1.21 | 1.21 |
| 7 | 0.896 | 1.00 | 1.10 | 1.31 | 1.31 |
| 8 | 0.833 | 1.00 | 1.17 | 1.50 | 1.50 |
| 9 | 0.690 | 1.00 | 1.31 | 1.93 | 1.93 |

The valve responses are also position related, (i.e., the valve responses are different at different positions) actuator-type related, and valve-type related. For a valve with a single-acting actuator, this position related nonlinearity is much higher in the air filling direction than in the air exhausting direction. Consider for example a 5% step change. An air-to-open valve opens much faster from 10% to 15% than from 90% to 95% due to the air filling, as described in detail, above. However, the response of this valve closing (air exhausting) is not drastically different over the entire operation range.

Mathematical modeling can simulate the above responses. For a typical single-acting spool valve, the air mass flow may be described by the following equations:

$$w_i = k_i(x)\sqrt{(p_s - p)p_s}\left[1 - \frac{(p_s - P)}{3P_s x_T}\right]\sqrt{\frac{T_{ref}}{T}} \tag{25}$$

$$w_0 = k_0(x)\sqrt{(P - P_e)P}\left[1 - \frac{(P - P_e)}{3Px_T}\right]\sqrt{\frac{T_{ref}}{T}} \tag{26}$$

$$(P_s - P)/P_s \leq X_T \tag{27}$$

$$(P - P_e)/P \leq X_T \tag{28}$$

where $k_i$=coefficient of flow from supply port to actuator
$k_o$=coefficient of flow from actuator to exhaust port
$p_e$=exhaust port pressure
p=actuator pressure
$p_s$=supply port pressure
T=air temperature
$T_{ref}$=reference temperature
$w_i$=air filling mass flow
$w_o$=air exhausting mass flow
x=pilot plug displacement
$x_T$=0.84 (pressure drop ratio factor, dimensionless)

Equations 25–28 are approximations of basic orifice flow, with the assumption that air is an ideal gas at an ambient temperature and at a pressure below 80 psi.

With the assumptions that air in the actuator is an ideal gas and the process in the actuator is adiabatic, it can be shown that:

$$pv = m/M\,RT \tag{29}$$

$$pv^\lambda = \text{const}@m = \text{const} \tag{30}$$

m=air mass, $lb_m$
M=air molecular weight
R=gas constant
v=air volume, $in^3$
$\lambda$=ratio of air specific heat, 1.40
P=pressure
T=temperature The following equation can be derived from the above two equations:

$$\frac{dp}{dt} = \frac{1}{v}\left[\frac{RT}{M}\frac{dm}{dt} - \lambda p \frac{dv}{dt}\right] \tag{31}$$

With the assumption of a constant effective area, the above equation may be rewritten for the air in both sides of the valve plug 62 to give:

$$\frac{dz}{dt} = \frac{RT}{M\lambda A_a}\frac{dm}{pdt} - \frac{v}{\lambda A_a p}\frac{dp}{dt} \tag{32}$$

$A_a$ = effective valve plug 62 area $z$ = valve stem position in inches or millimeters If the initial air volume is assumed to be zero and v is proportional to z, we can simplify the above equation as:

$$\frac{dz}{dt} = c_1 \frac{dm}{pdt} - \frac{z}{\lambda p}\frac{dp}{dt} \tag{33}$$

For air filling, $w_i$ is the change in air mass (dm/dt). For the same offset for the spool valve 24, the air filling mass flow is the largest when air volume is the least. The first term is the largest and the second term is least on the right side of the above equation, which causes valve movement (dz/dt) to be fastest when the actuator air pressure is the lowest. The valve 10 responses will slow down as air actuator 26 pressure rises and air volume increases (dm/pdt will drop quickly).

For air exhausting, $w_o$=dm/dt, the air exhausting mass flow becomes larger when the pressure for the actuator 26 rises. This results in a dm/pdt change that is much less significant than in the air filling operation. Therefore the gain compensation for air filling operation is much more important than for the air exhausting operation. As a result, the position related gain compensation must differentiate air filling and air exhausting operations.

From the above analysis, it becomes necessary to apply position related gain compensation 526 for air filling operation in order to have a more uniform dynamic performance in a wide valve operation range for the case when the actuator 26 is single-acting. Therefore, like the error size related gain compensation 524, the following similar gain compensation equations are used for the single-acting actuator 26:

$$f(\lambda_F, Z_M, Z_E) = \frac{(1-\lambda_F) + \lambda_F Z_M^R}{(1-\lambda_F) + \lambda_F Z^{ref}} \quad \text{when } Z_E \geq 0 \tag{34}$$

$$f(\lambda_E, Z_M, Z_E) = \frac{(1-\lambda_E) + \lambda_E Z_M^R}{(1-\lambda_E) + \lambda_E Z^{ref}} \quad \text{when } Z_E < 0 \tag{35}$$

$$0 \leq \lambda_F < 1,\ 0 \leq \lambda_E < 1 \tag{36}$$

$$Z_M^R = Z_M \quad \text{for air-to-open valve} \ldots \tag{37}$$

$$= 100\% - Z_m \quad \text{for air-to-close valve}$$

where $Z^{ref}$ is reference position, at which the factor f is always 1.0, independent of the value of the nonlinear coefficients $\gamma_F$ or $\gamma_E$. A typical 30% to 70% valve position can be used as the reference position, at which a self-tuning or manual tuning method can be applied to determine on the tuning parameter, including proportional gain. The proportional gains at other positions can be adjusted by the nonlinear coefficients $\gamma_F$ and $\gamma_E$ in order to achieve similar dynamic performance to the reference position.

According to the above analysis, the position related nonlinearity in the air filling direction is much higher than in the air exhausting direction for the single-acting actuator 26, resulting in the relation between two nonlinear coefficients:

$$\gamma_F > \gamma_E \tag{38}$$

Two corresponding gain compensation equations in integer format for a single-acting actuator may be desirable for saving calculation time and memory:

$$f(\gamma_F^0, Z_M, Z_E) = \frac{(12-\gamma_F^0) + \gamma_F^0 Z_M^R}{(12-\gamma_F^0) + \gamma_F^0 Z^{ref}} \text{ when } Z_E \geq 0 \quad (39)$$

$$f(\gamma_E^0, Z_M, Z_E) = \frac{(12-\gamma_E^0) + \gamma_E^0 Z_M^R}{(12-\gamma_E^0) + \gamma_E^0 Z^{ref}} \text{ when } Z_E < 0 \quad (40)$$

where the integers $\gamma_F^0$ and $\gamma_E^0$ are confined to a range of 0 to 11. Again, the position related nonlinear coefficients should be chosen so that $\gamma_F^0 > \gamma_E^0$.

If a reference error of 40% is chosen for an air-to-open valve, the value of the above non-linear gain factors is illustrated below in Table 2. There is a high/low limit module 530 to limit the output 534, calculated by Equation 15. The output 534 from the limit module 530 will be converted to an analog signal, for example, a current, which is connected to the I/P transducer 22 and pilot to control valve actuator pressure and valve position.

TABLE 2

| | $f(\gamma_F^0, Z_M, Z_E)$ or $f(\gamma_E^0, Z_M, Z_E)$ | | | | |
|---|---|---|---|---|---|
| $\gamma_F^0$ or $\gamma_E^0$ | $Z_M = 0\%$ | $Z_M = 20\%$ | $Z_M = 40\%$ | $Z_M = 80\%$ | $Z_M = 100\%$ |
| 0 | 1.00 | 1.00 | 1.00 | 1.00 | 1.00 |
| 2 | 0.926 | 0.963 | 1.00 | 1.07 | 1.11 |
| 4 | 0.833 | 0.917 | 1.00 | 1.17 | 1.25 |
| 6 | 0.714 | 0.857 | 1.00 | 1.29 | 1.43 |
| 8 | 0.556 | 0.778 | 1.00 | 1.44 | 1.67 |
| 9 | 0.455 | 0.727 | 1.00 | 1.55 | 1.82 |
| 10 | 0.333 | 0.667 | 1.00 | 1.67 | 2.00 |

For example, if $\gamma_E$ is equal to 2 and the measured valve position $Z_M$ is equal to 20%, the function $f(\gamma_E, Z_M, Z_E)$ will have the value 0.963, which can be used in Equation 21 above.

Valve Position Control Self-Tuning Routine

Valve position control characteristics differ significantly due to different types and sizes of actuators and valves made from different manufacturers, different characteristics of I/P transducers and relay devices, air supply pressures and capacities and process conditions, etc. This makes valve position controller tuning difficult and time-consuming. The present invention provides a self tuning routine that will account for variables such as controller gain, steady state error, and deadzone and automatically determine the control parameters for the control valve.

Figure 13:
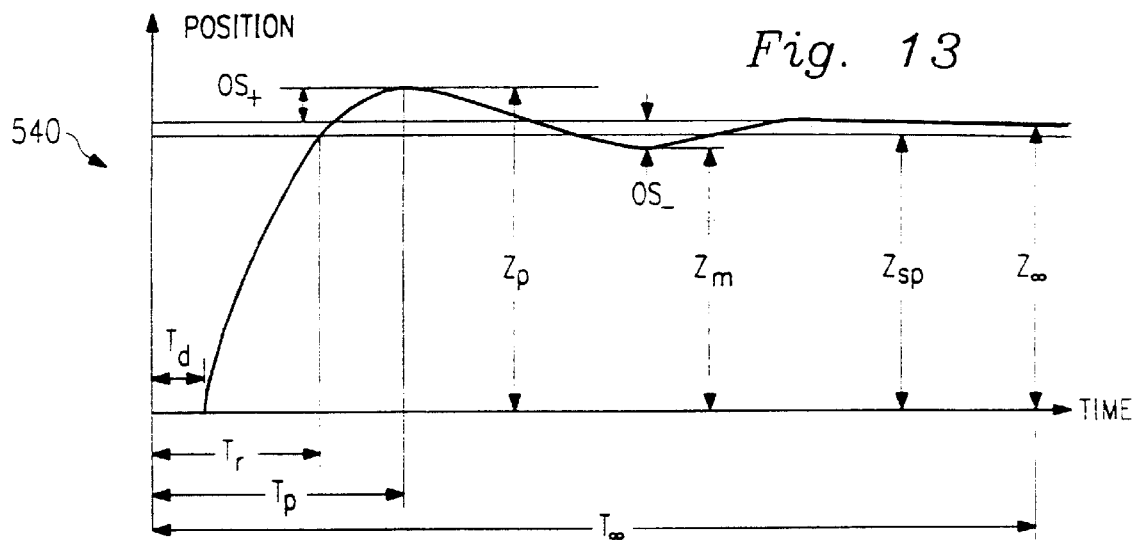
FIGS. 13 and 14 are graphs of valve position vs. time used by the positioner system of FIG. 1.
Figure 14:
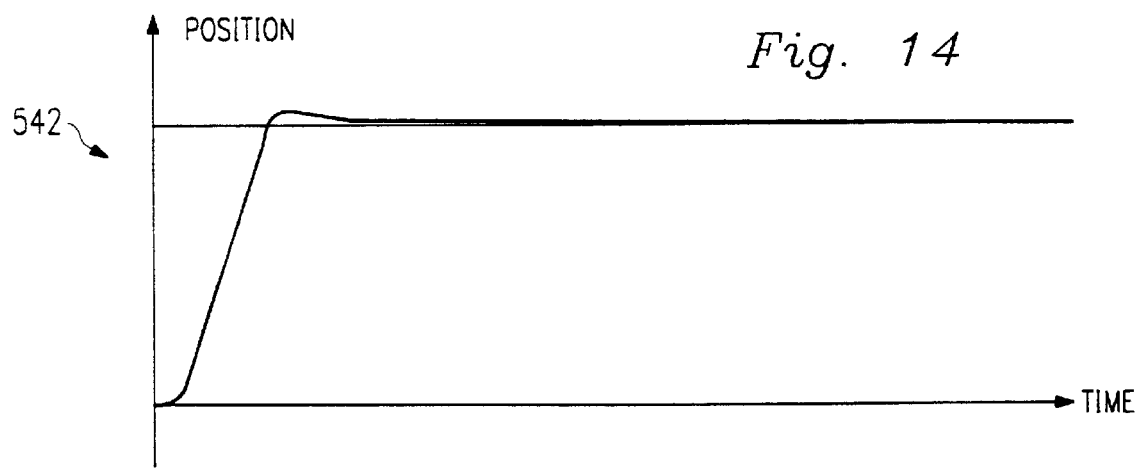

FIG. 13 provides a graph 540 that describes how valve position responds to a change in set point. FIG. 14 provides a graph 542 that describes an improved valve position response, as provided by a self-tuning routine described below. The graph 540 illustrates a typical step response of valve position after a successful self-tuning. In comparison with the graph 540, the graph 542 shows a faster response with less overshoot, e.g., a better dynamic performance. An objective of self-tuning is to obtain parameters for the controller module running in the microprocessor 18.

The self-tuning flow diagrams, below, utilize the following definitions:

Controller gain (P)—The ratio of the output versus input. The output is the OUT signal provided to the I/P transducer; the input is the position error, the difference of the position set-point and the actual position value.

Steady state integral control (I)—I is used to eliminate the steady state error, as described in Equation 21, supra.

Derivative time (To)—Delivery control variable to speed up the response of the valve. For example, to move the valve from 40 to 50, $T_D$ control will speed up the response at first and when the valve moves toward the set point 50%, the $T_D$ value will slow down the response to avoid an overshoot.

Dead time ($T_d$)—The interval of time between initiation of position set point change and the start of the resulting observable response.

Time delay ($\tau_d$)—The interval of time to reverse a valve movement during an open-loop test.

Dead zone ($Z_{dz}$)—The zone of position error in which the position error for processing to produce a control output is assumed to be zero. It is used intentionally to deal with the valve stick-slip behavior and noise.

Final position ($Z_\infty$)—The position the valve reaches after a sufficient time ($T_\infty$).

Maximum speed ($V_{max}$)—The maximum valve moving speed during the valve transient response.

Minimum speed ($V_{min}$)—The minimum valve moving speed during the period from ($T_d$+0.1 $T_p$) to (0.8 $T_p$), when 0.7 $T_p > T_d$.

Overshoot ($IS_+$)—The maximum excursion beyond the final steady-steady value (see FIG. 13). $IS_+ = abs[(Z_p - Z_\infty)/Z_\infty]$ Overshoot ($IS_-$)—The maximum excursion beyond the final steady-steady value in the opposite direction. $IS_- = abs[(Z_\infty - Z_m)/Z_\infty]$ Overshoot Limit ($IS_M$)—The maximum overshoot allowed, i.e., $IS_+, IS_- \leq IS_M$.

Peak Position ($Z_p$)—The maximum excursion beyond the initial position.

Peak Time ($T_p$)—The interval of time required for a valve to move from initiation of position set point change to its peak position ($Z_p$).

Response time ($T_r$)—The interval of time required for position to change from initiation of position set point change to 98% of final position ($Z_\infty$).

Steady-state error ($\Delta Z_\infty$)—The difference between the final position and position set point $\Delta Z_\infty = Z_\infty - Z_{sp}$.

Figure 15:
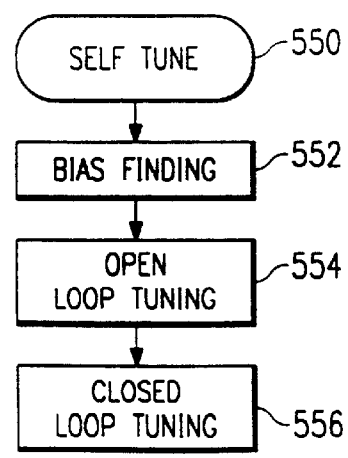
FIG. 15 is a flow diagram of a self-tune routine used by the positioner system of FIG. 1.

Referring to FIG. 15, a self-tuning routine 550 quickly and automatically determines appropriate control parameters to eliminate the need for manual tuning. In addition, the routine 550 can detect problems which may affect the system's function and performance. The self-tuning routine 550 includes three subroutines: a find BIAS routine 552, an open-loop test 554, and a closed-loop test 556.

Figure 16:
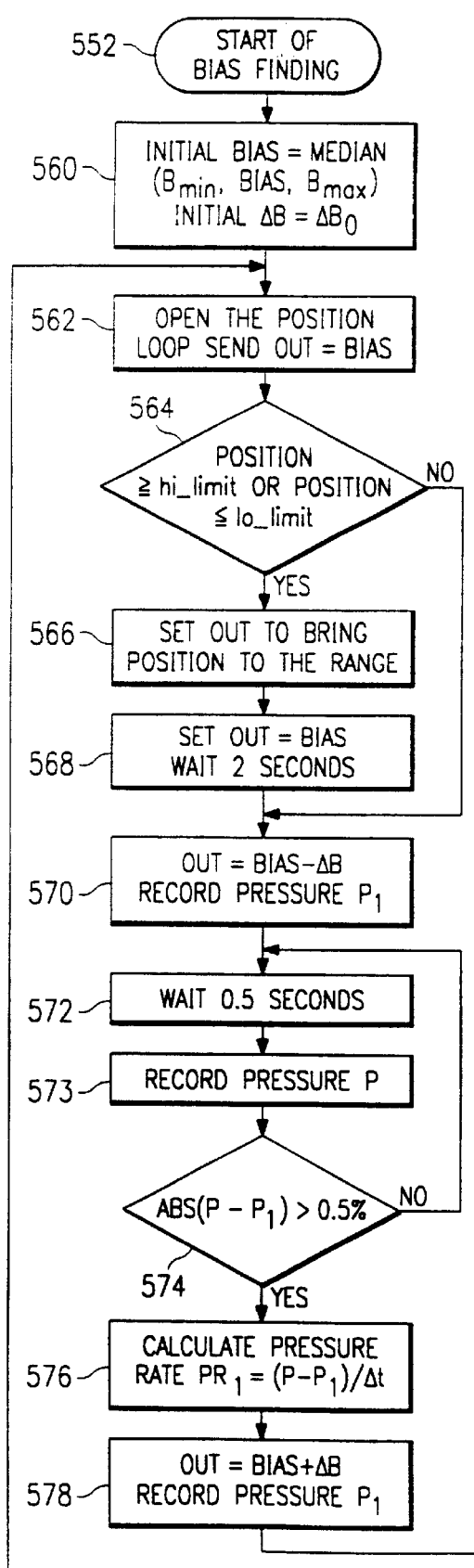
FIG. 16 is a flow diagram for a BIAS finding routine called by the self-tune routine of FIG. 15.
Figure 16:
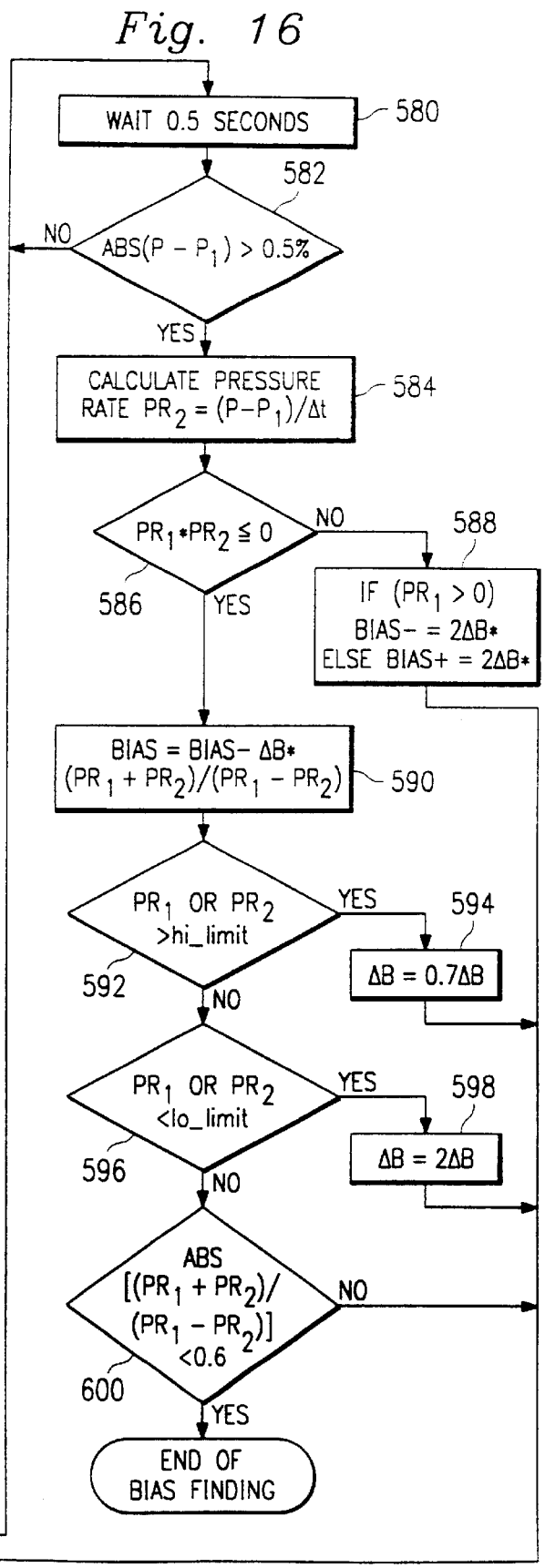

Referring to FIG. 16, the find BIAS routine 552 is designed to find an accurate value of the BIAS to the I/P transducer 22 for the second step of an open-loop test. At step 560, BIAS is initially set to the median of a predetermined minimum value for BIAS, "Bmin", the current value for BIAS (or a mid-value if no current value exists), and a predetermined maximum value for BIAS, "Bmax". A BIAS Change Value, "ΔB", is set to a predetermined initial value. At step 562, the OUT signal is set to BIAS.

At steps 564–568, the valve position is set within a predetermined high limit "hi_limit" and a predetermined low limit "lo_limit." At steps 570–574, the positioner 12 Waits till the absolute change in pressure "P1" from the pressure signal 40 is greater than 0.5%. At step 576, a first pressure rate "$PR_1$" is determined as the change in pressure over the elapsed time "Δt."

At steps 578–582, the positioner 12 again waits until the absolute change in pressure from the pressure signal 40 is greater than 0.5%. At step 584, a second pressure rate "$PR_2$" is determined as the change in pressure over the elapsed time $\Delta t$.

At step 586, if the pressure rates $PR_1$, $PR_2$ are of the same arithmetic sign, then at step 588, the BIAS value is adjusted accordingly and execution returns to step 562. Otherwise at step 590, BIAS is redefined to a new value based on the pressure rates $PR_1$, $PR_2$, and the BIAS Change Value $\Delta B$.

At step 392, if either of the pressure rates $PR_1$, $PR_2$ is above the high pressure limit "Hi_Limit", then at step 594 the BIAS Change Value $\Delta B$ is adjusted and execution returns to step 562. Otherwise at step 596, if either of the pressure rates $PR_1$ or $PR_2$ is below the low pressure limit "Lo_Limit", then at step 598 the BIAS Change Value $\Delta B$ is adjusted and execution returns to step 562. At step 600, if the change in pressure rates is relatively small, execution returns to step 562. Otherwise the find BIAS routine 552 returns the calculate BIAS value to the self-tuning routine 550.

Figure 17A:
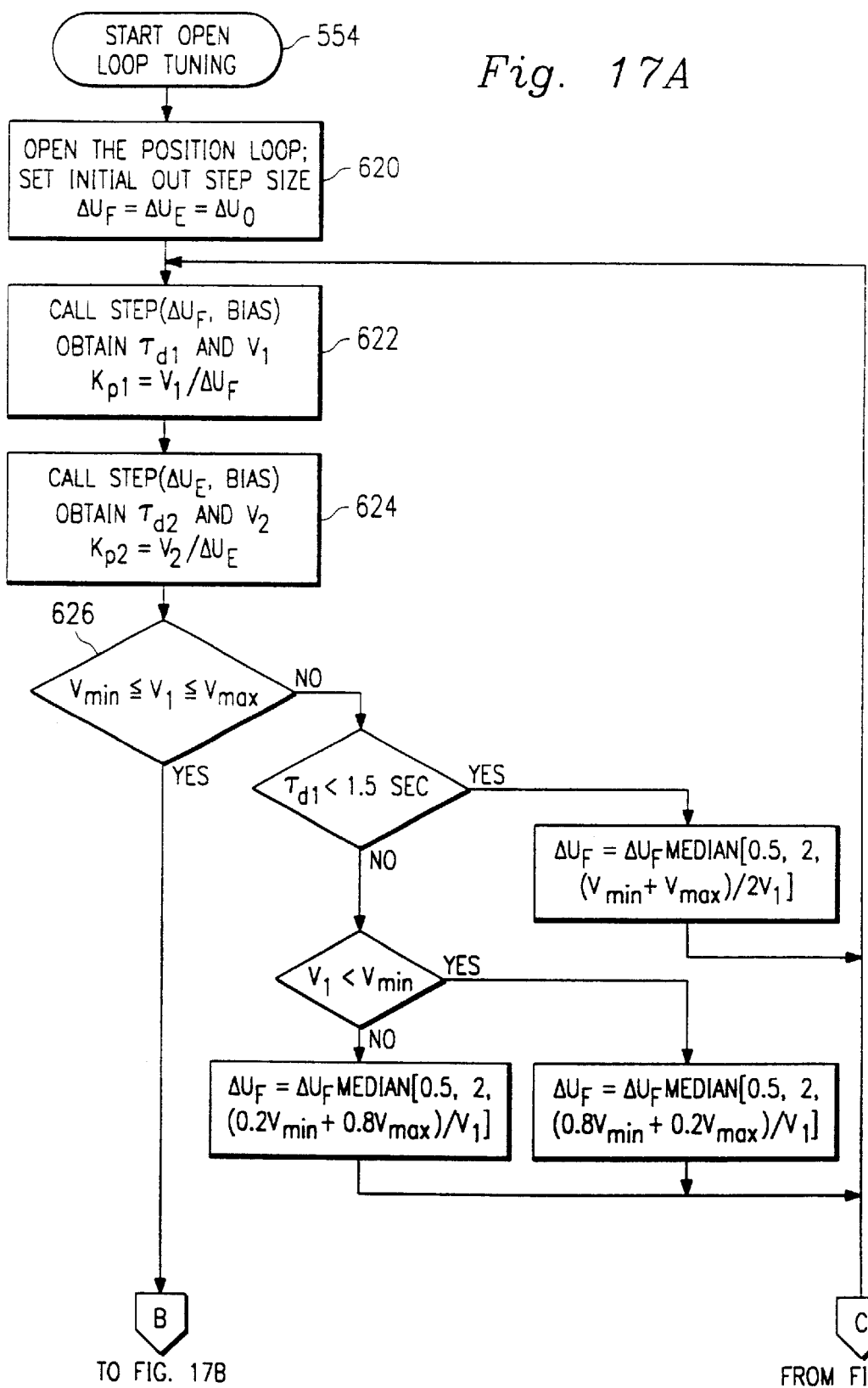
FIGS. 17a and 17b are flow diagrams of an open loop tuning routine called by the self-tune routine of FIG. 15.
Figure 17B:
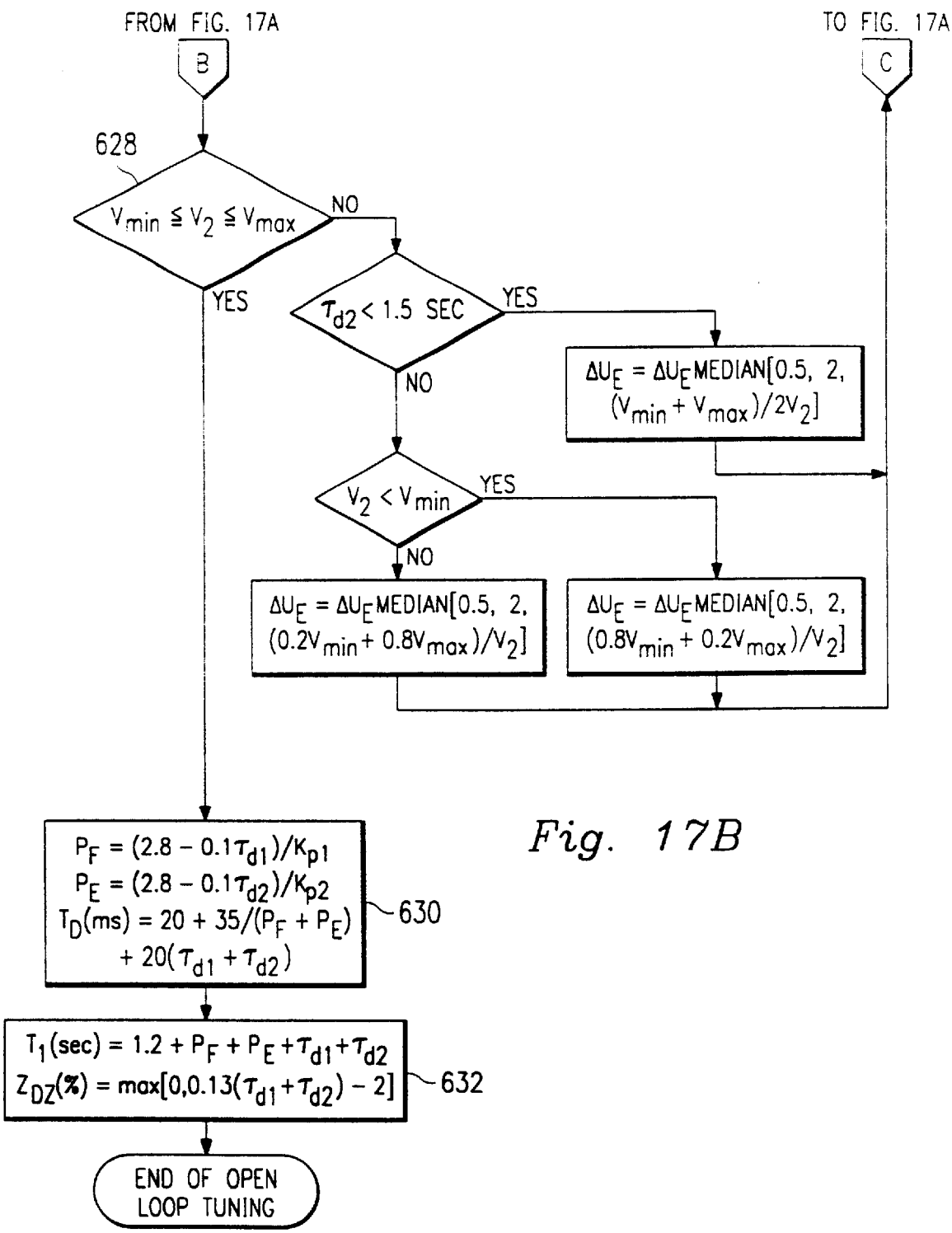

Referring to FIG. 17, the open-loop tuning test 554 is used for obtaining system characteristics and calculating control parameters. At step 620, the valve 10 is opened and step sizes for to the I/P transducer 22 "$\Delta U_F$," "$\Delta U_E$," and "$\Delta U_O$" are set to an initial value. At step 622, a STEP subroutine 623 (FIG. 18) is called to obtain a time delay $\tau_{d1}$ and a first valve moving speed $V_1$ for a valve transient response. An intermediate gain value $K_{p1}$ is also defined. At step 624, the STEP subroutine 623 is called again to obtain a second time delay $\tau_{d2}$ and a second valve moving speed $V_2$. A second intermediate gain value $K_{p2}$ is also defined.

At step 626, if the first valve moving speed $V_1$ is not between the minimum speed $V_{min}$ and maximum speed $V_{max}$, then the step size $\Delta U_F$ is updated and execution returns to step 622. Otherwise the routine proceeds to step 628. At step 628, if the second intermediate speed $V_2$ is not between the minimum speed $V_{min}$ and maximum speed $V_{max}$, then the step size $\Delta U_E$ is updated and execution returns to step 622. Otherwise, execution proceeds to step 630 where position set points $P_F$ and $P_E$ and the dead time $T_d$ are determined. At step 632, the time interval $T_I$ and the dead zone $Z_{dz}$ are calculated accordingly. Then, the open loop tuning routine 554 returns to the self-tuning routine 550.

Figure 18:
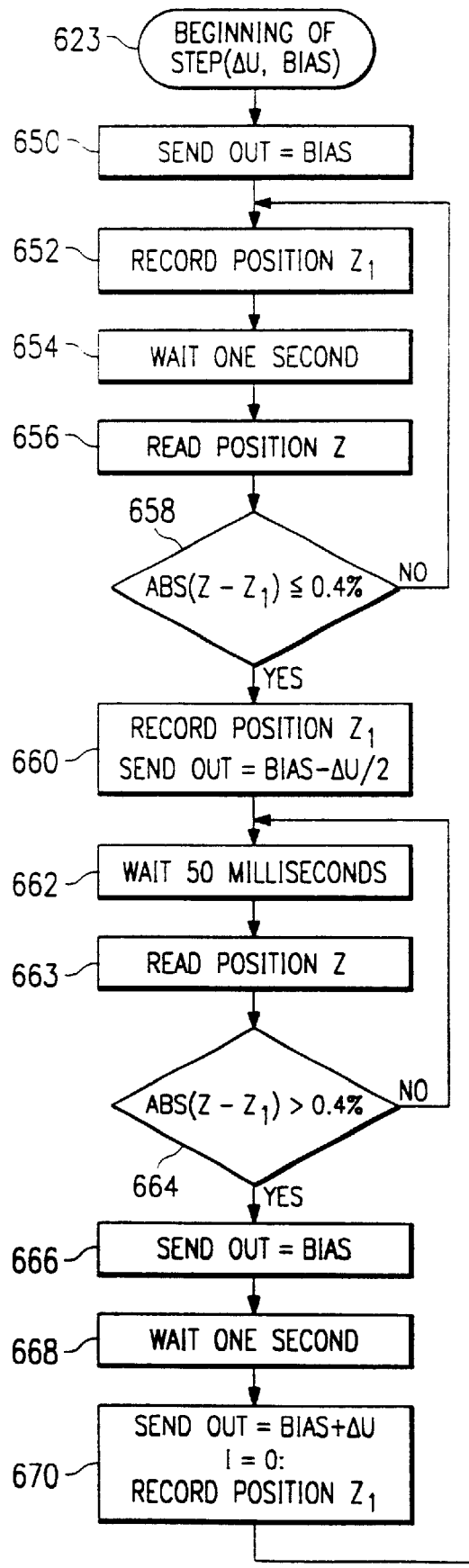
Figure 18:
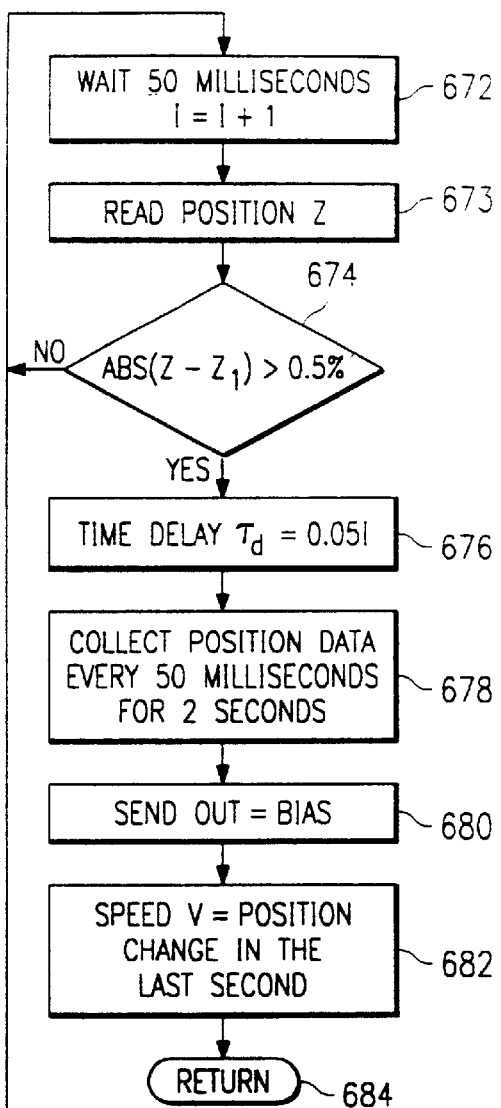

Referring to FIG. 18, the STEP subroutine 623 continually reads and stores position data Z for different OUT signal values to the I/P transducer 22. At step 650, the OUT signal is set to BIAS. At steps 652–658, two positions $Z_1$ and Z are continually read and stored until the valve position is relatively stable. At step 660, the OUT signal is then set to BIAS–$\Delta U/2$ and at steps 662–664, the two positions $Z_1$ and Z are continually read and stored until the valve position is relatively stable.

At step 666, the OUT signal is again set to BIAS. At step 668, the positioner 12 waits for the valve 10 to steady. At step 670, the OUT signal is set to BIAS+$\Delta U$ and the initial position $Z_1$ is re-stored. At steps 672–674, a counter "I" counts how long before the valve 10 has moved (position Z is significantly different from the initial position $Z_1$). At step 676, the time delay $\tau_d$ is calculated. At steps 678–682, the speed value V is determined as the change in position over a discrete period of time. At step 684, the STEP subroutine 623 returns to the procedure that called it.

Figure 19:
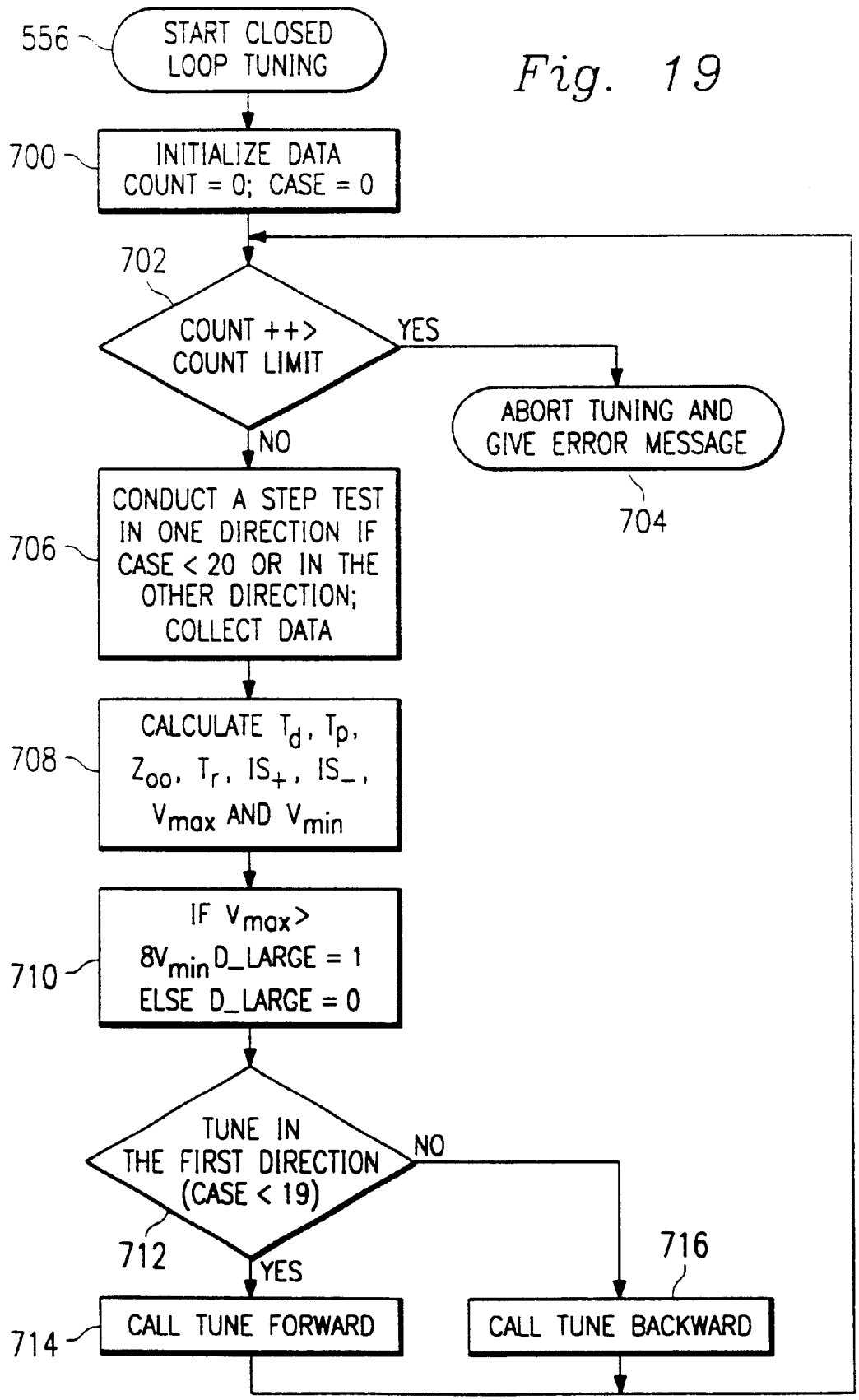
FIG. 19 is a flow diagram of a closed loop selftuning routine called by the self-tune routine of FIG. 15.

Referring to FIG. 19, the closed-loop test 556 closes the position loop and tunes the control parameters to achieve good dynamic responses in both opening and closing valve-movement directions by using tuning routines. A position loop is a path that includes a forward path for the signal to control the actuator and hence the valve position, a feedback path including the position sensor 46, and a comparator for comparing the forward path and feedback path.

Because individual components (e.g., the spool valve 24) will change in gain, it is not possible to have the overall loop gain constant. At step 700, two counters COUNT and CASE are set to zero. At step 702, if COUNT has exceeded a predetermined limit, then at step 704 an error message is shown on the display 52. Otherwise at steps 706–708, the valve is repeatedly moved so that the values $T_d$, $T_p$, $Z_p$, $Z_\infty$, $T_r$, $IS_+$, $IS_-$, $V_{max}$ and $V_{min}$ can be determined, as described above. At step 710, a flag D_Large is set. At step 712, if the counter CASE is below a predefined limit, then execution proceeds to step 714 where the valve 10 is tuned in a first direction. Otherwise, execution proceeds to step 716 where the valve 10 is tuned in the opposite direction.

Figure 20A:
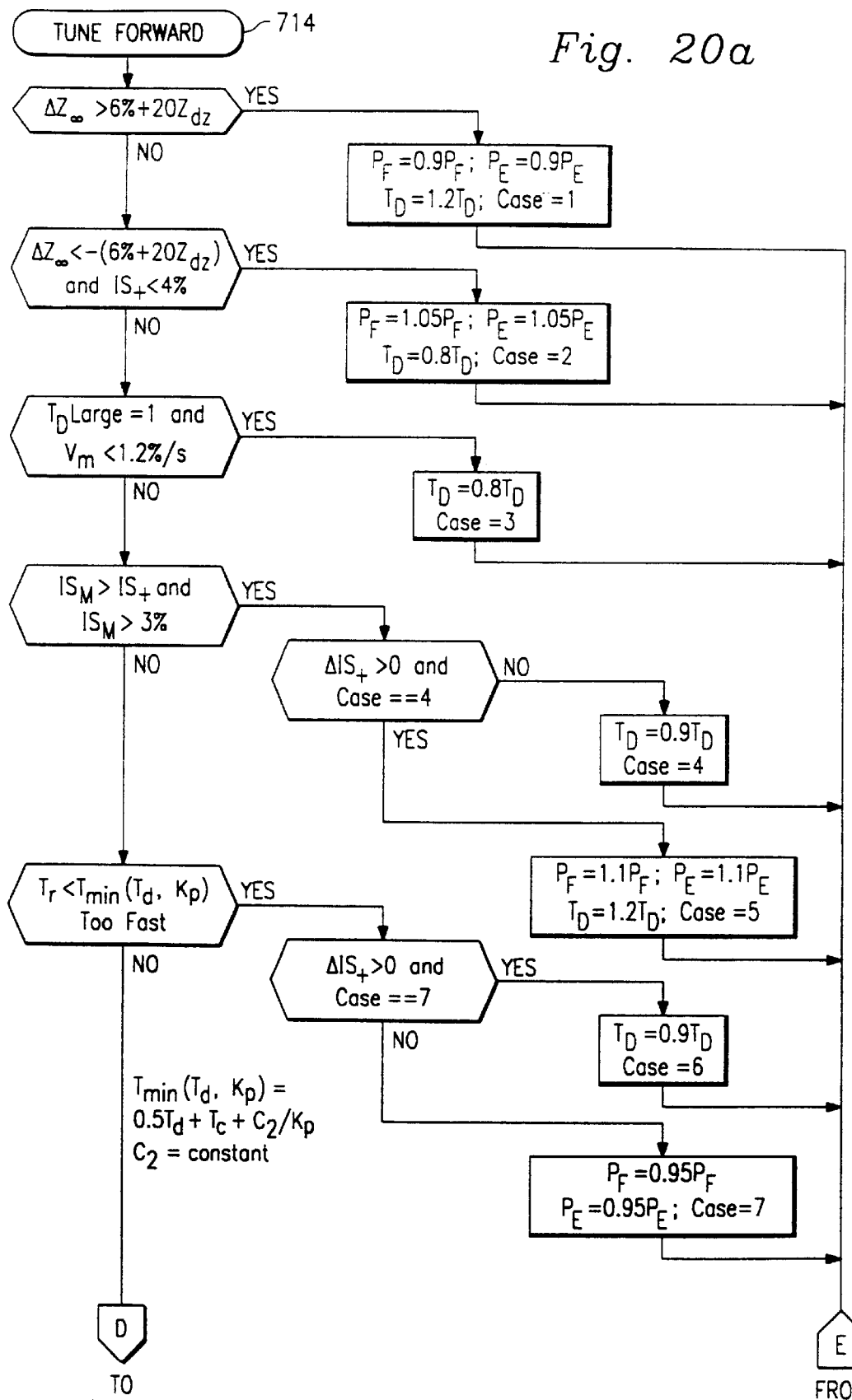
FIGS. 20a and 20b are flow diagrams of a tune forward subroutine called by the closed loop self-tuning routine of FIG. 19.
Figure 20B:
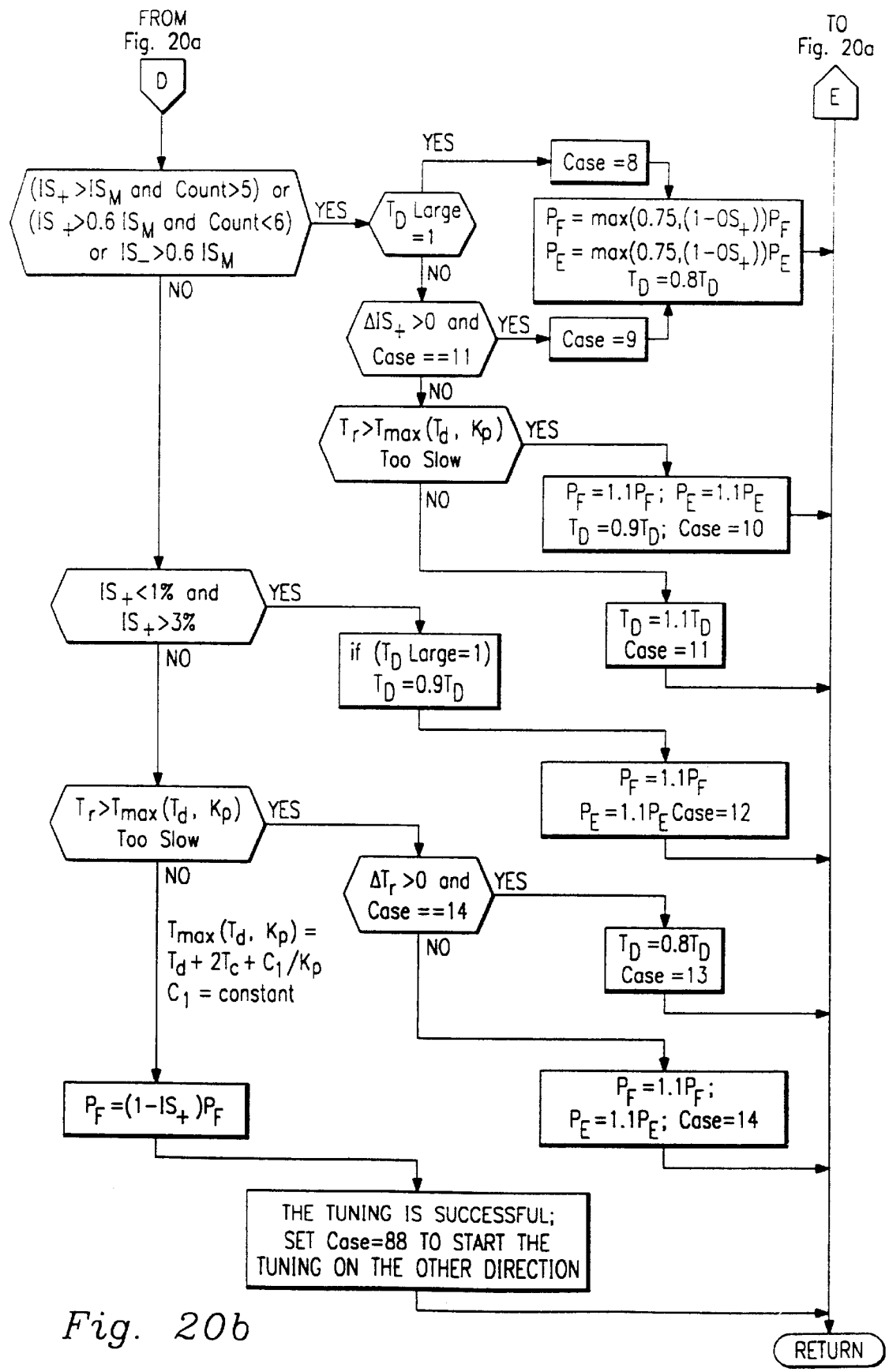
Figure 21:
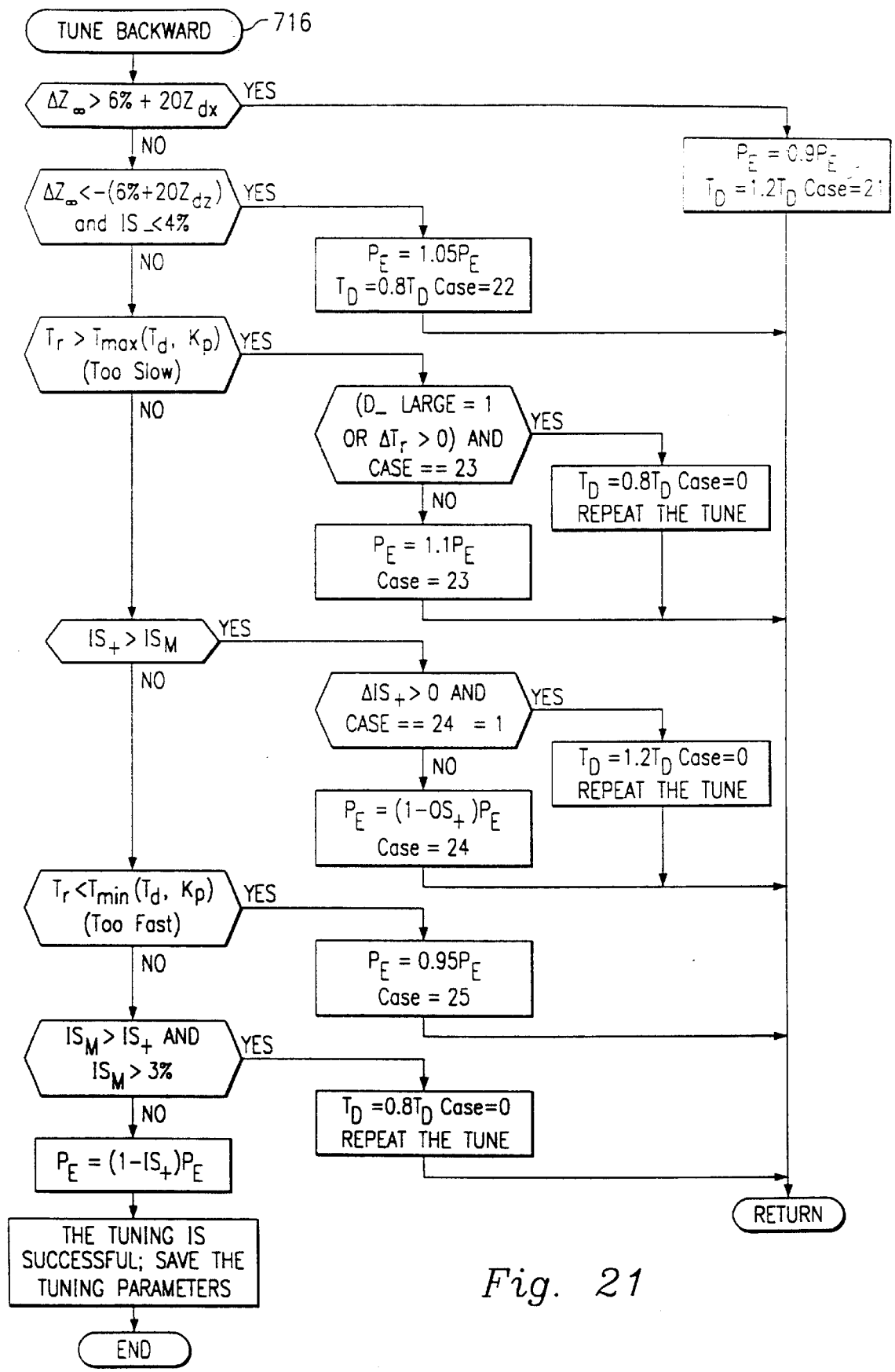
FIG. 21 is a flow diagram of a tune backward subroutine called by the closed loop self-tuning routine of FIG. 19.

Referring to FIGS. 20 and 21, the tune-forward subroutine 714 and tune-backward subroutine 716 calculate the values $T_D$, $P_F$, and $P_E$ and adjust the counter CASE accordingly. If the tune-forward subroutine 714 is successful, CASE is set to a value to ensure that the tune backward subroutine 716 will be performed next. If the tune backward subroutine 716 is successful, the closed-loop test 556 will terminate.

Referring again to FIG. 15, the self-tuning routine 550 includes many advantages over conventional routines. The routine 550 applies to a highly non-linear electro-pneumatic-mechanical system, even those with a large deadband. Also, the routine 550 handles asymmetric behavior of valve position control by tuning control gains for both valve moving directions. Further, the routine 550 estimates deadzones for valves with stick-slip behaviors. Further still, the routine 550 simplifies modeling by abstracting only the most important characteristics and uses this data only for control parameter estimation. The estimated parameters are refined by step responses of closed-loops. Even further, the routine 550, detects problems which affect valve performance and functioning.

Software Cam for Valve Self-Characterization

A mechanical cam is a metal plate used in valves. Different shapes of metal plates provide different characteristics for the valve. The valve characteristics are very important for flow control in a control loop, such as if a linear relationship is used between valve position and flow rate. Valve characteristic adjustment is one of most effective methods to obtain a constant loop gain. The process limitation to controller output, valve opening, and/or process variable should be set initially, so there will not be unacceptable disturbances to the process during on-line testing.

The present invention provides a software routine which behaves like a mechanical cam, and will hereinafter be referred to as a "software cam." Referring again to FIG. 1, in one embodiment, a software cam 750 is inserted between the microprocessor 18 output and the D/A converter 20 to obtain a desired relationship of controller output versus process variable. It is understood that the software CAM 750 may be stored in various places in the positioner 12.

Figure 22:
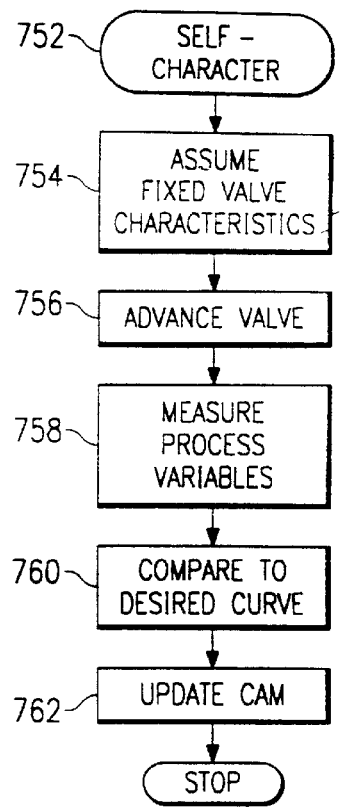
FIG. 22 is a flow diagram for a valve self-characterization routine used by the positioner system of FIG. 1.

Referring to FIG. 22, a self-characterization routine 752 initiates an on-line test and automatically determines appropriate valve characteristics based on the test data. First, at step 754, a fixed valve characteristic, such as equal percentage or linear, is assumed. At step 756, the controller moves the valve. At step 758, the corresponding steady-state process variables (flow, level, etc.) are measured. At step 760, the measured steady-state variables are compared with a desired curve of controller output versus process variable. At step 760, the difference between the steady-state variables and a desired relationship of controller output versus process variable is used to adjust the software valve characteristic, thereby minimizing the difference. The cam 750 is updated accordingly.

The self-characterization routine 752 can replace trial-and-error methods in determining a valve's characteristic. The routine can be easily applied to the microprocessor-based 18 valve controller of the positioner 12, which can accept a process variable signal. The self-characterization routine 752 assures uniformity of control performance under all conditions of operation, compensating for process non-linearities. This simplifies the controller design and simplifies the controller tuning to one typical process condition. Also, re-tuning the controller usually can be eliminated when process conditions change, and a uniform control performance is easy to maintain.

Fail to I/P Mode for Valve Positioner

Position feedback was added to improve accuracy of positioners. However, if the position sensor or position feed back signal fails, the position feedback will not operate, control will be lost and the positioner 12 will shut down. In response, some microprocessor based positioners are configured so that in case of certain types of positioner failure, the valve will be positioned in a safe condition or locked in place. When the position feedback is lost, the present invention uses the pressure feedback sensor 44 to control positioning with a minimal loss of accuracy. Therefore, the present invention provides the option of positioning the valve 10 based on the position implied from actuator pressure feedback signal 40 even in the event of position measurement failure.

Figure 23:
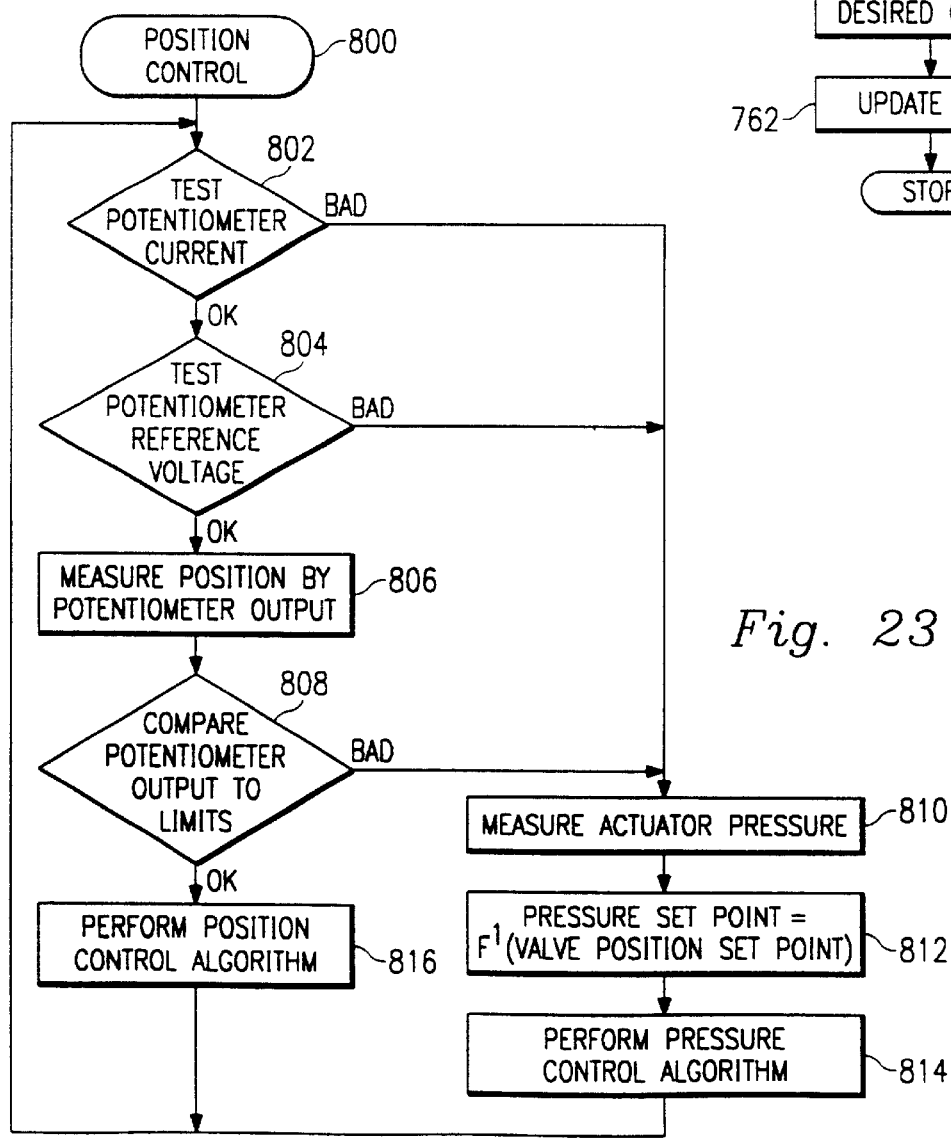
FIG. 23 is a flow diagram of detecting a failed position sensor used by the positioner system of FIG. 1.

Referring to FIG. 23, routine 800 directs the positioner 12 to identify a failed position sensor 46, such as if the positioner 12 relies on improper readings from the position feedback signal 42 in response to position controls. If a failed position sensor is detected, then the positioner 12 computes the actuator pressure required to achieve the desired position and uses a pressure control algorithm to set the valve.

At steps 802 and 804, the current and voltage level of the position sensor 46 is measured. At steps 806 and 808, the position feedback signal 42 is received and compared to predetermined limits. If any of the conditions from steps 802–808 fail the predetermined limits, then execution proceeds to step 810 where the actuator pressure is read through the pressure feedback signal 40.

At step 812, the controller converts a desired Valve Position to a corresponding Actuator Pressure. A typical relationship between Valve Position and Actuator Pressure is maintained in the microprocessor 18. This relationship can be preprogrammed, such as during manufacture of the positioner 12, determined during calibration routines, or continually maintained during normal operation. For example, the valve 10 can be stroked from one extreme to the other and the pressures at several positions recorded. As a general rule, the Valve Position is a function of several variables:

$$\text{Valve Position} = F(\text{Actuator Pressure, Process Pressure, Temperature, Friction}) \tag{41}$$

With a spring diaphragm actuator, the effects of process pressure, temperature and friction are relatively small, as compared to actuator pressure. Therefore, the above equation can alternatively be represented as:

$$\text{Valve Position} = F(\text{Actuator Pressure}) \tag{42}$$

and inversely:

$$\text{Actuator Pressure} = F^{-1}(\text{Valve Position}). \tag{43}$$

Therefore, the positioner 12 can determine the Actuator Pressure from the desired Valve Position with a moderate level of accuracy.

At step 814 a position control routine adjusts the actuator pressure to achieve the desired position as determined from the pressure feedback signal 40. Alternatively, if at step 808 all the voltage and position checks were acceptable, then at step 816 the position control routine adjusts the actuator pressure to achieve the desired position as determined from the position feedback signal 42.

Positioner with Seat Condition Diagnostic Routine

Leakage at the seat of a valve has always been a major control system problem and maintenance cost issue for valves in general. Leakage can be caused by normal wear, excessive wear due to trapped foreign materials, or excessive low lift throttling.

One source of seat leakage problems that cannot be accurately predicted is the trapping of foreign material between the elements of the valve seat 68 while closing the valve. The foreign material may not be there during subsequent closures and the valve may appear to be fully closed. Depending on application conditions, even the slightest seat 68 damage due to the trapped material can lead to excessive seat wear and damage during future lengthy periods of shutoff at high pressure drop.

Another problem that can cause seat leakage occurs in valves which provide very tight shutoff (approx. zero leakage allowed) and use soft elastomeric materials for the seat 68 to attain the best shutoff performance. However, at moderate to high pressure drop conditions, throttling at a very low lift can result in high flow velocities which can easily damage or destroy the elastomeric seat material.

A variety of methods have been used to address leakage problems, including monitoring down-stream components, using pneumatic relays to overcome low lift throttling, and establishment of maintenance schedules based on estimated wear. All of these methods have shortcomings which are overcome by the present invention.

Figure 24:
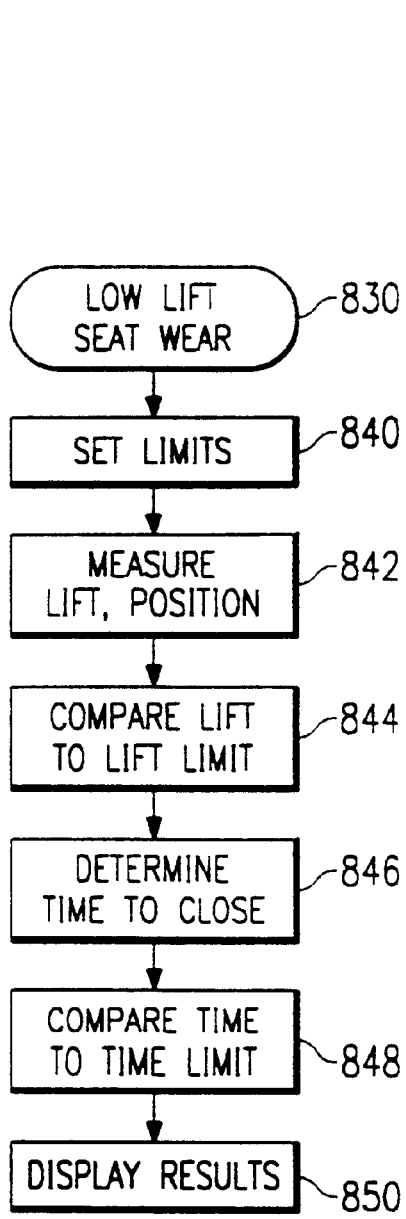
FIG. 24 is a flow diagram of a low lift seat wear diagnostic routine used by the positioner system of FIG. 1.
Figure 25:
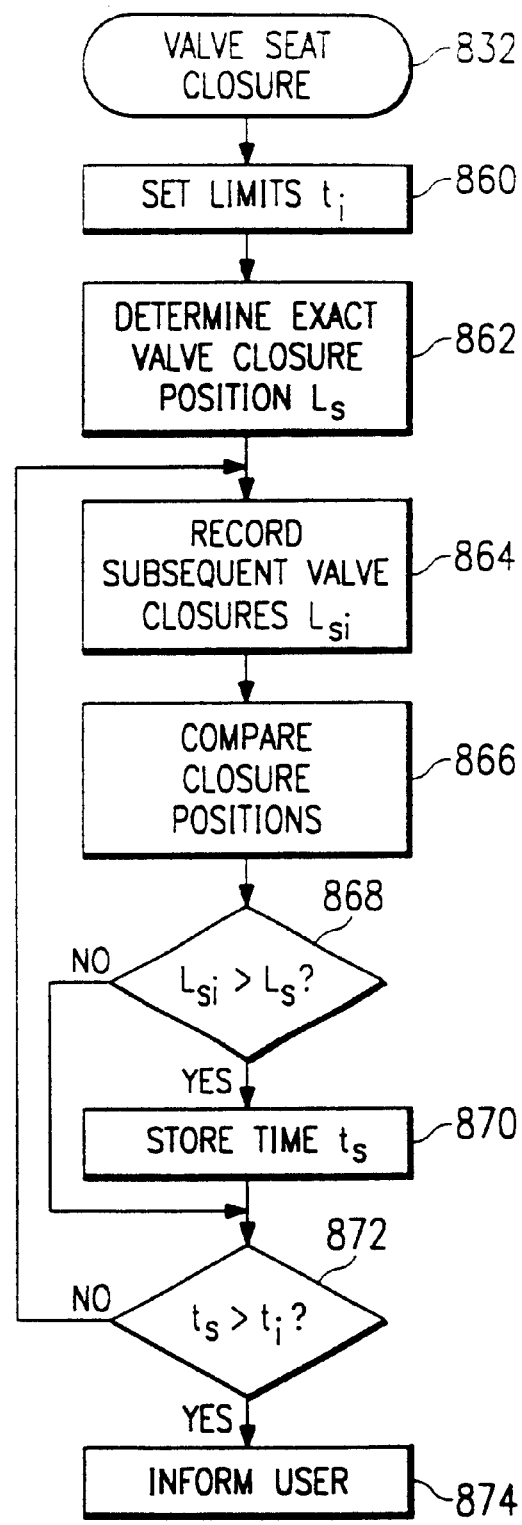
FIG. 25 is a flow diagram of a valve seat closure diagnostic routine used by the positioner system of FIG. 1.
Figure 26:
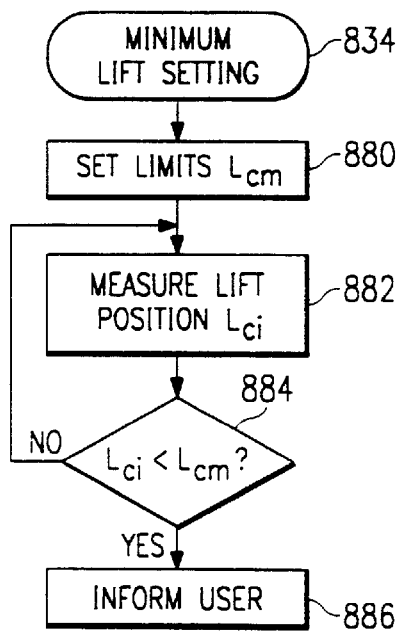
FIG. 26 is a flow diagram of a routine for determining a minimum controllable lift setting used by the positioner system of FIG. 1.

Monitoring the temperature of downstream components (piping) and/or ultrasonic vibration monitoring of the control valve stem only identify a leakage problem after it has occurred, and significant damage and loss of process efficiency can result before the system can be shutdown for repairs. In contrast, the routines of the present invention, as discussed in detail with respect to FIGS. 24–26, provide an improved predictive method to allow for proper control valve maintenance before the leakage has occurred, thereby resulting in a lower cost solution.

A pneumatic relay installed on the pneumatic actuator will not allow the valve to open at lift signals below a minimum set control signal, thus eliminating low lift throttling wear. The problem with this solution is that the valve is not allowed to even throttle through the region between closed (seated) and the low lift set point for a short duration, which may not be damaging. The present invention provides several seat condition diagnostic routines (FIGS. 24–26) for the positioner 12 which continuously monitor the time the valve 10 spends throttling at excessively low lifts. The routines also monitor both the time the valve 10 is closed and the time the valve is almost closed under shutoff conditions, maintaining a running total record of these times. The routines can allow throttling through the low lift region for a specified time before a warning is provided or the minimum set point is applied (the valve is closed). The recorded data can then be compared to the amount of time the valve 10 has spent closed during system operation to assess the potential for seat leakage problems.

Maintenance schedules are set up for control valves based on past service experiences of similar valves in similar services and application conditions and not on the specific valve's actual performance. Use of these schedules can result in premature maintenance on a system that is operating efficiently, or result in valve seat leakage prior to the predicted maintenance schedule, causing system operational problems and significant unscheduled downtime. A leaking control valve can also cause excessive valve trim and body wear, resulting in significant additional repair costs which could have been otherwise avoided by earlier detection. In contrast, the routines of the present invention (FIGS. 24–26) provide true operational data which results in a more accurate prediction for required valve maintenance schedules, thereby lowering the overall operational cost of the control valve application. The present routines do not require independent testing, system isolation, or system shutdown for predictive valve seat maintenance requirements. These decisions can be made during normal system operation, thus saving the added cost of the isolation and testing programs.

The present routines (FIGS. 24–26) include a low lift seat wear diagnostic routine 830, a valve seat closure diagnostic routine 832, and a minimum controllable lift setting routine 834. The routines can close the valve 10 if the control valve input signal requires a throttling lift below a predetermined set point (based on application service conditions). If acceptable to system control operation, the routines can prevent low lift throttling that may damage the valve seat.

Referring to FIG. 24, the low lift seat wear diagnostic routine 830 begins at step 840 when the user or factory chooses this option and sets limits based on service conditions. The limits include a minimum throttling lift position ($L_m$) where little or no seat 62 erosion will occur, and a maximum throttling time ($t_m$) allowed below this lift. These limits are saved in non-volatile memory 48. At step 842, during normal operation, the positioner 12 periodically measures the current lift ($L_c$) position and provides feedback 42 to the microprocessor 18. At step 844, the current lift $L_c$ is compared to the minimum throttling lift $L_m$ by microprocessor 18. At step 846, the microprocessor 18 determines if the valve is in the closed position. If the valve 10 is not closed ($L_c$>closed position) and if $L_c$<$L_m$, the total running time $t_c$ is recorded until either $L_c \geq L_m$ or the valve is closed. At step 848, the time $t_c$ is periodically compared with the maximum time $t_m$. At step 850, if $t_c$>$t_m$, then a diagnostic message such as

"VALVE SEAT INSPECTION IS REQUIRED"

is shown on the display 52.

Referring to FIG. 25, the valve seat closure diagnostic routine 832 begins at step 860 when the user or factory chooses this option and sets limits based on service conditions. The limits include a maximum seat leakage time ($t_i$) during valve 10 closed condition. Further, an initial value for a running time $t_s$ is determined. At step 862, after initial installation or valve trim refurbishment and calibration, the exact valve closed/seated position ($L_s$) is provided by the position feedback signal 42 to the microprocessor 18. At step 864, for subsequent valve 10 closings, a closed lift position ($L_{si}$) is provided by the position feedback signal 42 to the microprocessor 18 and is recorded. At step 866, the closed lift position $L_{si}$ is compared to the exact valve closed/seated position $L_s$. If at step 868 the closed lift position $L_{si}$ is greater than the exact valve closed/seated position $L_s$, then at step 870, the total running time $t_s$ is recorded. Execution then proceeds to step 872 where the running time $t_s$ is compared to the maximum seat leakage time $t_i$. If $t_s$>$t_i$, the positioner 12 provides a diagnostic message such as

"VALVE SEAT INSPECTION IS REQUIRED"

on the display 52. Otherwise, execution returns to step 864.

Referring to FIG. 26, the minimum controllable lift setting routine 834 begins at step 880 when the user or factory chooses this option and sets limits based on service conditions. The limits include a minimum controllable lift position ($L_{cm}$) based on the service (application) minimum required controllable flow level in terms of % of maximum valve travel. At step 882, during normal operation, the positioner 12 periodically measures a current lift position ($L_{ci}$) which is provided by the position feedback signal 42 to the microprocessor 18. The current lift position $L_{ci}$ is an average of two measurement taken 10 seconds apart. At step 884, the current lift position $L_{ci}$ is compared to the minimum controllable lift position $L_{cm}$. If $L_{ci}$<$L_{cm}$, the positioner 12 provides a diagnostic message such as

"VALVE MINIMUM LIFT SETTLING VIOLATION"

on the display 52. In some embodiments, the valve 10 may then be opened above the position $L_{cm}$. Otherwise, execution returns to step 882.

The above described diagnostic routines (FIGS. 24–26) provide many additional benefits. The routines provide the minimum controllable valve lift point $L_{cm}$, which can be set based on type valve 10 and application service conditions. The routines also record valve operational throttling time $t_c$ spent at or below the lift point $L_m$. The routines provide a warning if certain time periods exceed predetermined limits. The routines can be combined such as to close the valve 10 if the operational throttling time $t_s$ spent at or below the minimum controllable lift point $L_{cm}$ exceeds the time $t_m$.

Further, the routines provide an accurate valve closed position comparison to the initial set closure position (closure deviation). The routines also record the time that the valve spent at a closure deviation position. The routines provide a warning if closure deviation occurs for a set duration. The routines also record a total time that the valve spends closed during system operation. Further still, the routines compare the operational throttling time spent at or below the minimum controllable lift point and the total time the valve spends closed during system operation to a specified limit set for the application and provides remaining operational time allowed before valve seat maintenance is required.

Expert System Constraints on Custom Characterization

To provide a custom flow characteristic for the valve 10, the positioner 12 has a mode of operation that provides a graph on the display 52 representing a full range of flow capacity and a full range of the input signal. Although the extreme points for 0 and 100% flow capacity and input signal are preset, intermediate points on the graph are fully customizable. Therefore, a user can alter the points on the graph and thereby customize the flow characteristic.

Figure 27:
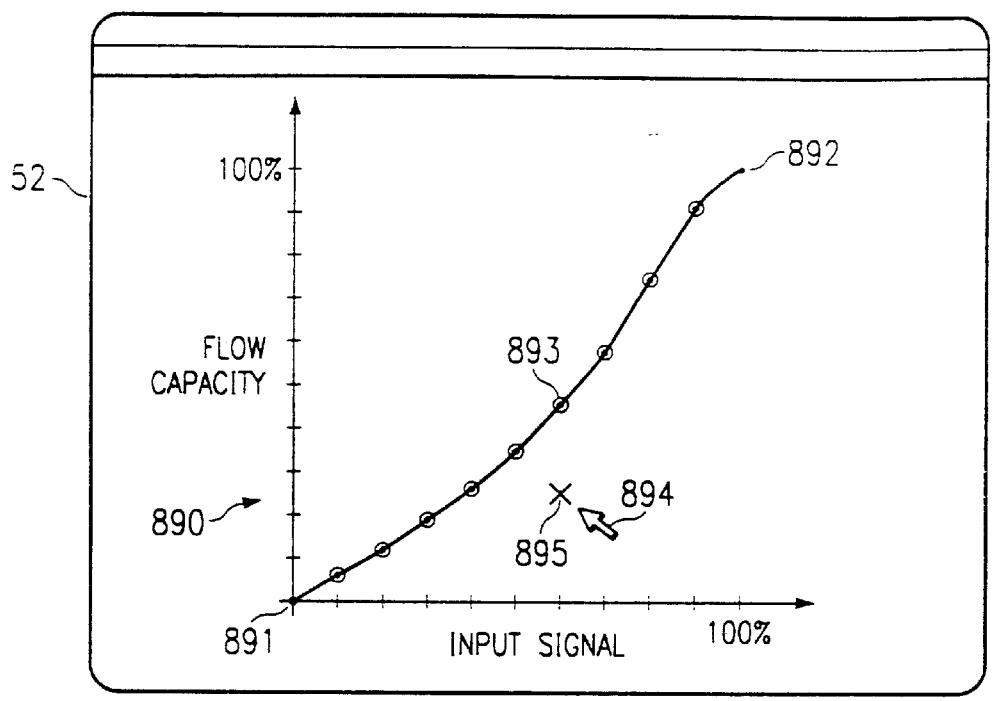
FIGS. 27–28 are screen displays of a graph of flow capacity versus valve position and a pop-up window that is displayed if the user requests an invalid position change which are provided by the positioner system of FIG. 1.
Figure 28:
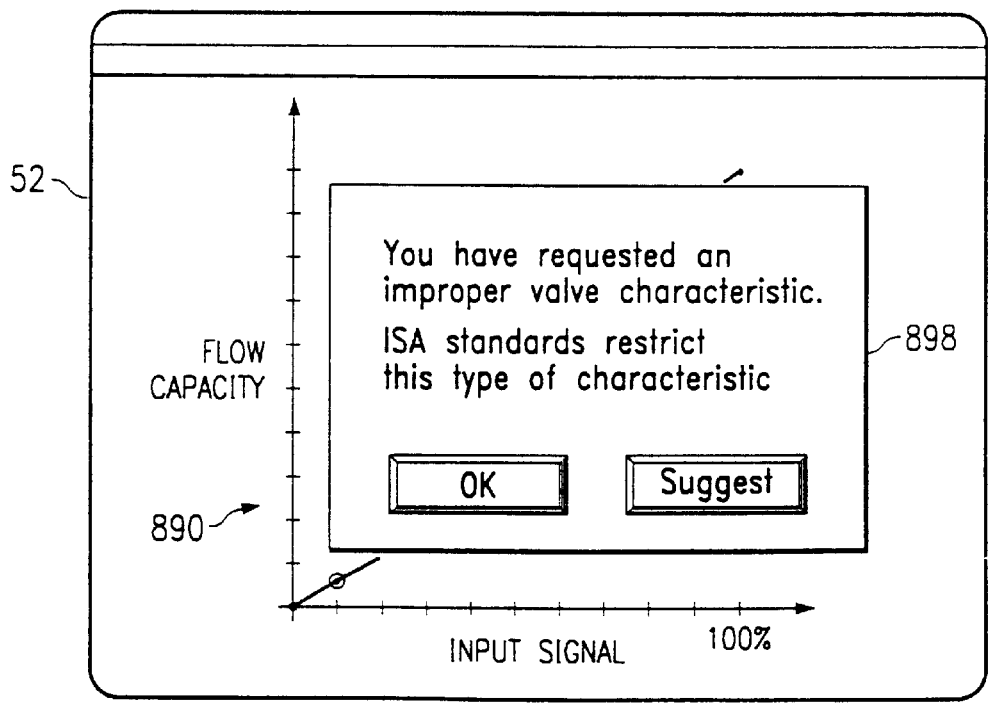

Referring to FIGS. 27–28, the display 52 may contain, for example, a graph 890. The graph 890 has a vertical axis that is normalized to flow capacity of the valve 10 and a horizontal axis that is normalized to the valve input signal. In the preferred embodiment, two values for the graph 890 are preset: point 891 indicates 0% flow capacity when the valve is fully closed and point 892 indicates 100% flow capacity when the valve is fully open. It is understood that other embodiments may not have such limitations.

Between the points 891 and 892 are several additional points that define the customized characterization function $F_c$ for the valve 10. Each of the individual points can be moved, thereby providing a very simple method for modifying the characterization function. Further, by having the characterization function so described, it can easily be stored as a table of (position, capacity) coordinates in memory 48.

For example, the user may select or move a point 893 and move it to a new location on the graph 890 using a pointer device 894. Once moved, the controller re-connects the points to provide a fully customizable flow characteristic for the valve.

In the preferred embodiment, the positioner does have some control over the point selection to prevent detrimental characterization. For example, if the user attempts to move the point 893 to a location 895, it can be seen from the present example that this location will cause a slope reversal (i.e., the sign of the slope for the flow characteristic switches). In response, the controller will alert the user and not enter the value, such as is shown with a dialog box 898 in FIG. 28.

The controller may also require the flow characteristic to adhere to certain industry standard flow characteristics. For example, the slope between any two points should not be more than double or less than half the slope of the previous two points. If so, a dialog box similar to the box 898 can alert the user.

Figure 29:
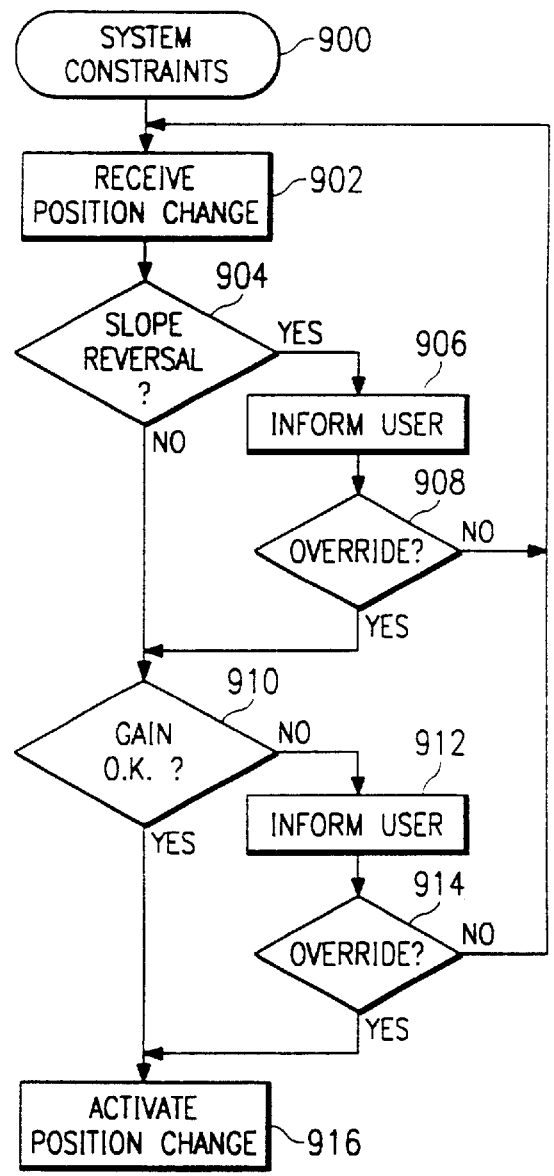
FIG. 29 is a flow diagram of a routine for determining system constraints used by the positioner system of FIG. 1, using the screen displays of FIGS. 27–28.

Referring to FIG. 29, a routine 900 performs some of the features described above. At step 902, the controller receives a characterization change request from the user. At step 904, the controller checks to see if this is a slope reversal of the flow characteristic in the valve 10. If so, then at step 906 the user is informed (e.g., through the display 52) and at step 908, the controller checks to see if the user has overridden the detected condition. If not, execution returns to step 902. If the user does override the condition, or if there is no slope reversal, then at step 910 the positioner 12 determines if the slope change would cause an undesirable change in valve gain. If so, then at step 912 the user is informed (e.g., through the display 52) and at step 914, the controller checks to see if the user has overridden the detected condition. If not, execution returns to step 902. If the user does override the condition, or if the valve gain is acceptable, then at step 916 the controller activates the position change requested by the user.

It is understood that modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for performing diagnostics on a valve having an actuator, the method comprising:

positioning the valve at a first end of a test range of valve positions;

incrementing fluid pressure to the actuator until it reaches a second end of the test range;

waiting between increments;

decrementing fluid pressure to the actuator until it reaches the first end of the test range;

waiting between decrements;

sampling valve position and actuator pressure data during the incrementing and decrementing;

storing the sampled position and pressure data in memory; and analyzing the stored data.

2. The method of claim 1 wherein the test range is relatively small, as compared to a full range of movement of the valve.

3. The method of claim 2, wherein the valve is operating in a normal operation mode while incrementing, decrementing and sampling data.

4. A system for performing diagnostics on a valve having an actuator, comprising:

means for positioning the valve at a first end of a test range of valve positions;

means for incrementing a fluid pressure to the actuator until it reaches a second end of the test range and decrementing the fluid pressure to the actuator until it reaches the first end of the test range;

means for determining if the valve is stable between increments and decrements;

means for sampling valve position and actuator pressure data as the fluid pressure is incrementing and decrementing, wherein the data is sampled when the valve is stable;

memory for storing the sampled position and pressure data and means for analyzing the stored data.

5. The system of claim 4 wherein the test range is relatively small, as compared to a full range of movement of the valve.

6. The system of claim 5, comprising means for operating the valve in a normal operation mode while incrementing, decrementing and sampling data.

7. The method of claim 1, comprising determining if the valve is stable, and wherein sampling valve position and actuator pressure data comprises sampling the data after the valve is stable.

8. The method of claim 7, wherein the sampled position and pressure data stored in memory are from samples taken after the valve is stable.

9. The method of claim 1, comprising turning off automatic valve positioning when incrementing and decrementing pressure.

10. A method of performing diagnostics on a valve having an actuator, the method comprising:

positioning the valve at a first end of a test range of valve positions;

incrementing fluid pressure to the actuator until it reaches a second end of the test range;

determining if the valve is stable between increments;

decrementing fluid pressure to the actuator until it reaches the first end;

determining if the valve is stable between decrements;

sampling valve position and actuator pressure data during the incrementing and decrementing while the valve is stable;

storing the sampled position and pressure data in memory; and analyzing the stored data.

* * * * *